US006816500B1

(12) United States Patent
Mannette et al.

(10) Patent No.: US 6,816,500 B1
(45) Date of Patent: Nov. 9, 2004

(54) APPARATUS, METHOD AND SYSTEM FOR MULTIMEDIA ACCESS NETWORK CHANNEL MANAGEMENT

(75) Inventors: Michael R. Mannette, Rolling Meadows, IL (US); Douglas J. Newlin, Wheaton, IL (US); Kurt W. Steinbrenner, Bartlett, IL (US)

(73) Assignee: 3Com Corporation, Marlborough, MA (US)

( * ) Notice: Subject to any disclaimer, the term of this patent is extended or adjusted under 35 U.S.C. 154(b) by 968 days.

(21) Appl. No.: 09/613,070

(22) Filed: Jul. 10, 2000

(51) Int. Cl.[7] .............................................. H04L 12/28
(52) U.S. Cl. ........................ 370/431; 370/341; 370/337; 370/347; 370/436
(58) Field of Search ................................. 370/431, 436, 370/252, 337, 342, 347, 341, 343, 336, 335; 725/121, 123, 126; 455/451, 452, 453

(56) References Cited

U.S. PATENT DOCUMENTS

| | | | |
|---|---|---|---|
| 4,644,533 A | 2/1987 | Braff et al. | ................... 370/94 |
| 4,881,263 A | 11/1989 | Herbison et al. | ............. 380/21 |
| 4,996,685 A | 2/1991 | Farese et al. | ............... 370/58.1 |

(List continued on next page.)

FOREIGN PATENT DOCUMENTS

WO    WO 00/67385    11/2000

OTHER PUBLICATIONS

Droms, R., *Dynamic Host Configuration Protocol*, Request for Comments 1541, Oct. 1993, pp. 1 to 31.
RFC 791, *Internet Protocol, DARPA Internet Program Protocol Specification*, Sep. 1981, pp. 1–37.
Postel, J., *Internet Protocol, DARPA Internet Program Protocol Specification*, RFC 792, Sep. 1981, pp. 1–14.
Postel, J., *User Datagram Protocol*, RFC 768, Aug. 28, 1980, pp. 1–3.

(List continued on next page.)

*Primary Examiner*—Wellington Chin
*Assistant Examiner*—Chuong Ho
(74) *Attorney, Agent, or Firm*—McDonnell Boehnen Hulbert & Berghoff LLP

(57) ABSTRACT

An apparatus, method and system are provided for multimedia access network channel management, such as channel management in a hybrid fiber-coaxial cable network, for voice (telephony), video, fax and data transmission. The preferred system embodiment includes a plurality of cable telephony modems (CTMs), for such voice (telephony), video, fax and data transmission, and includes a cable modem termination system (CMTS). For upstream communication from the CTMs to the CMTS, the network provides a plurality of channels, formed by a combination of FDM and TDMA. When a CMTS receives an multimedia network access message having a comparative priority from a CTM, the CMTS determines whether there is a first channel which is available from the plurality of channels, and if so, assigns a first transmission corresponding to the multimedia network access message to the first channel. When there is no available first channel, the CMTS determines whether there is a second transmission on a second channel which is moveable to a third channel, and if so, reassigns the second transmission to the third channel and assigns the first transmission corresponding to the multimedia network access message to the second channel. When there is no available first channel and no second transmission which is moveable, the CMTS determines whether there is a third transmission on an assigned channel having a lower comparative priority than the comparative priority of the multimedia network access message, and when there is a third transmission, the CMTS removes the third transmission from the assigned channel to form a vacated channel, and assigns the transmission corresponding to the multimedia network access message to the vacated channel.

60 Claims, 15 Drawing Sheets

U.S. PATENT DOCUMENTS

| | | | |
|---|---|---|---|
| 5,014,234 A | 5/1991 | Edwards, Jr. | 364/900 |
| 5,138,712 A | 8/1992 | Corbin | 395/700 |
| 5,301,273 A | 4/1994 | Konishi | 395/200 |
| 5,347,304 A | 9/1994 | Moura et al. | 348/12 |
| 5,430,727 A | 7/1995 | Callon | 370/85.13 |
| 5,442,749 A | 8/1995 | Northcutt et al. | 395/200.09 |
| 5,488,412 A | 1/1996 | Majeti et al. | 348/10 |
| 5,489,897 A | 2/1996 | Inoue | 340/870.39 |
| 5,528,595 A | 6/1996 | Walsh et al. | 370/85.13 |
| 5,583,931 A | 12/1996 | Schneider et al. | 379/399 |
| 5,586,121 A | 12/1996 | Moura et al. | 370/404 |
| 5,598,410 A | 1/1997 | Stone | 370/469 |
| 5,600,717 A | 2/1997 | Schneider et al. | 379/399 |
| 5,606,606 A | 2/1997 | Schneider et al. | 379/399 |
| 5,608,446 A | 3/1997 | Carr et al. | 348/6 |
| 5,610,910 A | 3/1997 | Focsaneanu et al. | 370/351 |
| 5,623,542 A | 4/1997 | Schneider et al. | 379/399 |
| 5,623,601 A | 4/1997 | Vu | 395/187.01 |
| 5,636,211 A | 6/1997 | Newlin et al. | 370/465 |
| 5,675,732 A | 10/1997 | Majeti et al. | 395/200.01 |
| 5,675,742 A | 10/1997 | Jain et al. | 395/200 |
| 5,678,041 A | 10/1997 | Baker et al. | 395/609 |
| 5,708,654 A | 1/1998 | Arndt et al. | 370/242 |
| 5,710,885 A | 1/1998 | Bondi | 395/200.54 |
| 5,725,510 A | 3/1998 | Hartmann et al. | 395/200.5 |
| 5,761,602 A | 6/1998 | Wagner et al. | 455/3.1 |
| 5,778,181 A | 7/1998 | Hidary et al. | 395/200.48 |
| 5,784,597 A | 7/1998 | Chiu et al. | 395/552 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | 395/200.61 |
| 5,790,806 A | 8/1998 | Koperda | 395/200.82 |
| 5,793,747 A | 8/1998 | Kline | 370/230 |
| 5,799,086 A | 8/1998 | Sudia | 380/23 |
| 5,805,804 A | 9/1998 | Laursen et al. | 395/200.02 |
| 5,809,252 A | 9/1998 | Beighe et al. | 395/200.57 |
| 5,812,819 A | 9/1998 | Rodwin et al. | 395/500 |
| 5,815,664 A | 9/1998 | Asano | 395/200.57 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 395/200.52 |
| 5,828,655 A | 10/1998 | Moura et al. | 370/236 |
| 5,828,666 A | 10/1998 | Focsaneanu et al. | 370/389 |
| 5,835,720 A | 11/1998 | Nelson et al. | 395/200.54 |
| 5,835,727 A | 11/1998 | Wong et al. | 395/200.68 |
| 5,841,777 A | 11/1998 | Cohen | 370/433 |
| 5,848,233 A | 12/1998 | Radia et al. | 395/187.01 |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,884,024 A | 3/1999 | Lim et al. | 395/187.01 |
| 5,892,754 A | 4/1999 | Kompella et al. | 370/236 |
| 5,894,479 A | 4/1999 | Mohammed | 370/401 |
| 5,903,558 A | 5/1999 | Jones et al. | 370/351 |
| 5,909,549 A | 6/1999 | Compliment et al. | 709/223 |
| 5,913,037 A | 6/1999 | Spofford et al. | 395/200.56 |
| 5,915,119 A | 6/1999 | Cone | 395/750.02 |
| 5,922,049 A | 7/1999 | Radia et al. | 709/220 |
| 5,922,051 A | 7/1999 | Sidey | 709/220 |
| 5,923,659 A | 7/1999 | Curry et al. | 370/401 |
| 5,926,458 A | 7/1999 | Yin | 370/230 |
| 5,929,850 A | 7/1999 | Broadwin et al. | 345/327 |
| 5,941,988 A | 8/1999 | Bhagwat et al. | 713/201 |
| 5,943,604 A | 8/1999 | Chen et al. | 455/5.1 |
| 5,954,797 A | 9/1999 | Sidey | 709/223 |
| 5,958,007 A | 9/1999 | Lee et al. | 709/219 |
| 5,960,177 A | 9/1999 | Tanno | 395/200.59 |
| 5,974,453 A | 10/1999 | Anderson et al. | 709/220 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | 713/201 |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A | 12/1999 | Woundy | 370/401 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 455/3.1 |
| 6,018,767 A | 1/2000 | Fijolek et al. | 709/218 |
| 6,031,841 A | 2/2000 | Woundy | 370/410 |
| 6,032,019 A | 2/2000 | Chen et al. | 455/5.1 |
| 6,041,041 A | 3/2000 | Ramanathan et al. | 370/241 |
| 6,046,826 A | 4/2000 | Lu et al. | 709/222 |
| 6,046,979 A | 4/2000 | Bauman | 370/229 |
| 6,049,546 A | 4/2000 | Ramakrishnan | 370/412 |
| 6,049,825 A | 4/2000 | Yamamoto | 709/221 |
| 6,052,724 A | 4/2000 | Willie et al. | 709/223 |
| 6,058,421 A | 5/2000 | Fijolek et al. | 709/225 |
| 6,061,349 A | 5/2000 | Coile et al. | 370/389 |
| 6,064,372 A | 5/2000 | Kahkoska | 345/173 |
| 6,065,049 A | 5/2000 | Beser et al. | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | 713/201 |
| 6,073,178 A | 6/2000 | Wong et al. | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 | 5/2001 | Fijolek et al. | 709/250 |
| 6,243,369 B1 | 6/2001 | Grimwood et al. | 370/335 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar et al. | 370/486 |
| 6,275,853 B1 | 8/2001 | Beser et al. | 709/223 |
| 6,289,377 B1 | 9/2001 | Lalwaney et al. | 709/222 |
| 6,295,554 B1 | 9/2001 | Karadogan et al. | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |
| 6,393,478 B1 | 5/2002 | Bahlmann | 709/224 |

| | | | |
|---|---|---|---|
| 6,442,158 B1 | 8/2002 | Beser | 370/352 |
| 6,449,291 B1 | 9/2002 | Burns et al. | 370/516 |
| 6,453,472 B1 | 9/2002 | Leano et al. | 725/111 |
| 6,490,727 B1 | 12/2002 | Nazarathy et al. | 725/129 |
| 6,510,162 B1 | 1/2003 | Fijolek et al. | 370/432 |
| 6,546,017 B1 * | 4/2003 | Khaunte | 370/412 |
| 6,650,624 B1 * | 11/2003 | Quigley et al. | 370/252 |
| 2002/0122050 A1 | 9/2002 | Sandberg | 345/705 |
| 2002/0136165 A1 | 9/2002 | Ady et al. | 370/241 |
| 2003/0028991 A1 | 2/2003 | Hardt et al. | 725/107 |

OTHER PUBLICATIONS

RFC 793, *Transmission Control Protocol, DARPA Internet Program Protocol Specification*, Sep. 1981, pp. 1–68.

Case, J. et al., *A Simple Network Management Protocol (SNMP)*, RFC 1157, MAy 1990, pp. 1–26.

Sollins, K., *The TFTP Protocol (Revision 2)*, RFC 1350, Jul. 1992, pp. 1–9.

Alexander, S., *DHCP Options and BOOTP Vendor Extensions*, RFC 2132, Mar. 1997, pp. 1–37.

"Radio Frequency Interface Specification (Interim Specification) SP–RFIv1.1–103–991105", MCNS Holdings, L.P., 1999, pp. Ii to 366.

"Radio Frequency Interface Specification (Interim Specification) SP–RFI–I04–980724", MCNS Holdings, L.P., 1997, pp. ii to 196.

"Radio Frequency Interface Specification (Interim Specification) SP–RFI–I05–991105", MCNS Holdings, L.P., 1999, pp. ii to 202.

"Radio Frequency Interface Specification (Interim Specification) SP–RFIvI1.1–I06–001215", MCNS Holdings, L.P., 2000, pp. ii to 432.

"Internet Engineering Task Force", Request for Comments 2131, Dynamic Host Configuration Protocl (DHCP), Mar. 1997, pp. 1 to 42.

S. Adiraju, J. Fijolek, IPCDN Telephony Return MIB, Internet Engineering TaSk Force, Internet Draft, "<draft–ietf–ipcdn–tri–mib–00.1.txt>," Mar. 1998, pp. 1 to 26.

Kyees, P.J. et al., *ADSL: A New Twisted–Pair Acces to the Information Highway*, IEEE Communications Magazine, vol. 33, Issue 4, Apr. 1995, pp. 52–60.

Huang, Yin–Hwa et al., *Design of an MPEG–Based Set–Top Box for Video on Demand Services*, Acoustics, Speech, and Signal Processing, 1995, ICASSP–95., 1995 International Conference, vol. 4, ISBN: 0–7803–2431–5, May 9–12, 1995, pp. 2655–2658.

"A Solution for the Priority Queue Problem of Deadline–Ordered Service Disciplines," N.R. Figueria, IEEE International Conference on Computer Communications and Networks, Sep. 22–25, 1997, pp. 320–325.

"Cable Modem to Customer Premise Equipment Interface Specification (Interim) SP–CMCI–I02–980317", Multimedia Cable Network Systems (MCNS) Holdings, L.P., Cable Television Laboratories, Inc., 1998, pp. ii to 40.

"Operations Support System Interface Specification Baseline Privacy Interface MIB (Interim Specification) SP–OS-SI–BPI–I01–980331", MCNS Holdings, L.P., 1997 and 1998, pp. ii to 33.

"Cable Modem Termination System–Network Side Interface Specification (Interim Specification) SP–CMTS–N-SII01–960702", MCNS Holdings, L.P., 1996, pp. ii to 13.

"Removable Security Module Interface Specification (Interim Specification) SP–RSMI–I01–980204", MCNS Holdings, L.P., Cable Television Laboratories, Inc., 1997, pp. ii to 47.

"Baseline Privacy Interface Specification (Interim) SP–B-PI–I01–970922", MCNS Holdings, L.P., 1997, pp. ii to 65.

"Operations Support System Interface Specification (Interim) SP–OSSII01–970403", MCNS Holdings, L.P., 1997, pp. 1 to 30.

"Radio Frequency Interface Specification (Interim Specification) SP–RFI–I02–971008", MCNS Holdings, L.P., 1997, pp. ii to 186.

"Cable Modem Telephony Return Interface Specification (Interim) SP–CMTRI–I01–970804", MCNS Holdings, L.P., Cable Television Laboratories, Inc., 1997, pp. ii to 73.

"Security System Specification (Interim Specification) SP–SSI–I01–970506", MCNS Holdings, L.P., 1997, pp. ii to 103.

* cited by examiner

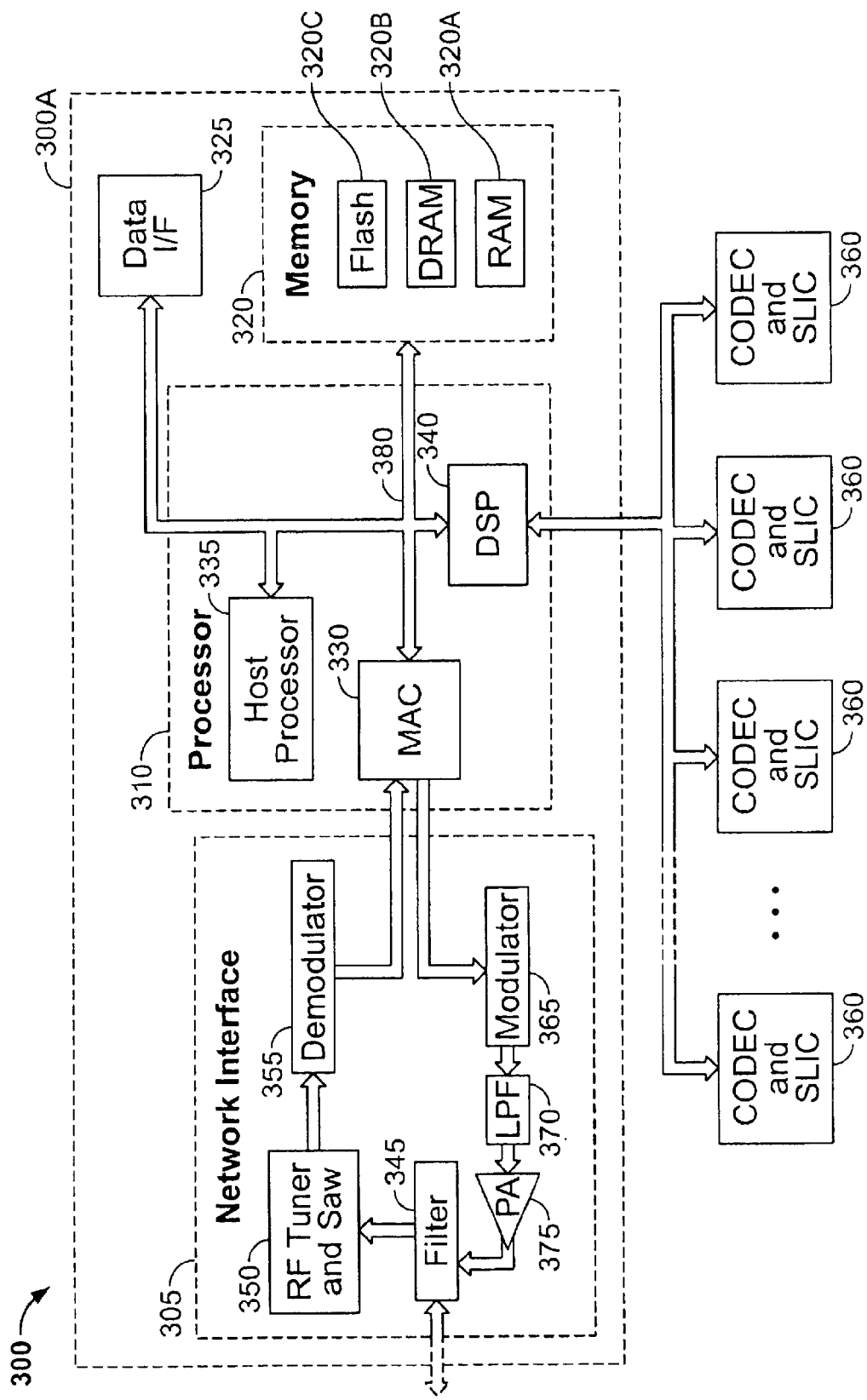

APPARATUS, METHOD AND SYSTEM FOR MULTIMEDIA ACCESS NETWORK CHANNEL MANAGEMENT

FIELD OF THE INVENTION

The present invention relates, in general, to telecommunication and data communication systems and, more particularly, to an apparatus, method and system for multimedia access network channel management in a hybrid optical fiber and coaxial cable communication system.

BACKGROUND OF THE INVENTION

The Internet Protocol (IP) has emerged as a dominant standard for packet data networks, as evidenced by, among other things, the rapid growth of electronic mail (email) systems and communication utilizing the World Wide Web. This rapid growth has fostered the demand for high-speed, broadband access networks, which both provide high-speed packet data transmission, for video, text, web pages and other data, and provide traditional telecommunication services, such as telephony (voice), facsimile (fax) and TDD (Telecommunications Device for the Deaf) transmission (collectively "multimedia"). Various broadband access networks have been proposed, such as under the DOCSIS and CableLabs standards, which utilize a full duplex (two-way) capable hybrid optical fiber and coaxial cable ("hybrid fiber/coax") network to deliver high speed Internet access, telecommunication services and other multimedia to homes, offices, and other premises.

Presently in such a hybrid fiber/coax network being developed by 3Com Corporation, a centralized, primary device known as a cable modem termination system ("CMTS") (also referred to as a telephony modem termination system) broadcasts transmissions to multiple subscriber devices referred to as cable modems ("CMs"), for data transmission, and cable telephony modems ("CTMs"), not only for data transmission (identical to a CM) but also adding telephony capability such as "plain old telephony service" ("POTS"). Transmissions from the CMTS to the CMs and CTMs are referred to as downstream transmissions. Transmissions from multiple CMs and/or CTMs to the CMTS are referred to as upstream transmissions. In such networks, upstream and downstream transmissions are typically asymmetric, with a greater capacity provided in the downstream direction.

Access to such networks is typically provided based upon various requests transmitted to the CMTS by the various CMs and CTMs; accordingly, such networks may be referred to as "access networks". Following a grant of access, typically by the primary device such as a CMTS, upstream transmissions utilize a combination of frequency division multiplexing ("FDM") and time division multiple access ("TDMA"), with any given upstream transmission channel specified by a transmission frequency and one or more time slots.

One of the challenges for a hybrid fiber/coax network is providing a user or subscriber with a quality of service equivalent to the service provided by the current public switched telephone network ("PSTN"). Specifically, users of the current PSTN have come to expect that the telephone system is highly available and the user is able to place calls whenever they desire, i.e., the user does not experience "blocking" by a lack of capacity within the network. One example of this user expectation occurs when a user experiences an emergency and dials a 911 emergency service. Simply stated, while blocking has occurred during widespread geographic emergencies, such as during the California earthquakes of the late 1980s and early 1990s, there is generally sufficient system capacity that a user of the current PSTN expects to be immediately connected to emergency services after dialing 911. As a result of this user expectation, the PSTN has been designed to provide sufficient capacity and minimal blocking.

Hybrid fiber/coax networks and systems, using a combination of FDM and TDMA for upstream transmissions, are challenged to provide users such immediate access on demand to the FDM/TDMA channels. This challenge is exacerbated when the CTM provides for broadband data transmission and multiple lines of POTS, with the CTM expected to be used for all communication needs, including connection to emergency 911 services, fax services, TDD services, and data services.

As a consequence, a need remains for an apparatus, method and system which provides for access network management, to provide a level or quality of service comparable to the PSTN, while simultaneously providing broadband multimedia transmission capability. Such an apparatus, method and system should provide for a minimal potential blocking of emergency calls and voice calls. In addition, such an apparatus, method and system should provide for optimal data transmission, including optimal fax and TDD quality. Such an apparatus, method and system should be user friendly, user transparent, and capable of implementation within existing hybrid fiber/coax networks.

SUMMARY OF THE INVENTION

An apparatus, method and system are provided for multimedia access network channel management, such as channel management in a hybrid fiber-coaxial cable network, for voice (telephony), video, fax and data transmission. The preferred system embodiment includes a plurality of multimedia transmission devices or multimedia modems, such as cable telephony modems ("CTMs") or cable modems ("CMs"), for such voice (telephony), video, fax and data transmission, and includes a multimedia termination system or device, such as a cable modem termination system ("CMTS"). The multimedia termination system provides the access network channel management, defining which multimedia transmission devices may transmit and receive information at any given time. In addition, the multimedia termination system provides for access to broader networks, such as packet-based networks and to the public switched telephone network ("PSTN").

For upstream communication from the CTMs to the CMTS, the network provides a plurality of channels, formed by a combination of frequency division multiplexing and time division multiple access. In the preferred embodiment, channels are utilized for two types of services, a reserved (or dynamic) services, having a constant bit rate, such as for telephony, fax and data services, and best efforts services, having a variable bit rate, such as for data services (such as email and internet activity). A CTM may gain access to the network through a poll from the CMTS, followed by transmitting a request, or without a poll from the CMTS, by transmitting a request utilizing a contention methodology. The various requests for either type of service (reserved or best efforts) are referred to generally herein as multimedia network access messages or simply as access requests, and include dynamic service requests (of various forms), best efforts requests, and gate messages (from a call management server).

Of particular significance, the present invention utilizes three major concepts in multimedia channel management. First, given that CTMs are constrained to transmit on a single carrier frequency at a given time, all of the various, mixed multimedia services for a given CTM are managed on a total, complete and non-independent basis, with potentially multiple channels allocated and managed on a single carrier frequency for the given multimedia transmission device. For example, if a given multimedia transmission device is currently engaged in a data transmission session and a telephony line goes off hook, a channel for the telephony line will be assigned to the same carrier frequency as the data session in progress. Also for example, in the event that a given CTM having two voice calls and a best efforts data transmission need to be moved to another carrier frequency (such as to accommodate a 911 call or a high bandwidth transmission from another CTM), then this entire group of services (voice plus data) for the given CTM are managed and moved together, as an aggregate, rather than piecemeal. The various embodiments of the present invention utilize a sophisticated searching and priority mechanism to move and manage all such channel usage, in order to provide a vacant channel on a particular carrier frequency, if needed.

Second, multimedia transmission is managed on both a polled and a best efforts basis, with specific polling utilized to prevent blocking, and with an additional best efforts service utilized to maximize system throughput for variable bit rate data transmissions. For example, through either a response to a poll or via contention, a multimedia transmission device may reserve a network channel for a particular type of service, such as telephony. During the time interval between reservation of the service and activation of the reserved service, the reserved channel may be utilized for best efforts services, such as variable bit rate data transmission.

Third, various comparative priorities are implemented to effectively ensure that certain types of services, such as 911 emergency access calls, are not blocked due to system capacity, and also to ensure that other services, such as fax, are of optimal quality. For example, to ensure non-blocking of 911 calls, in the event that the system is operating at full capacity, a lower priority service will be removed (or deleted) from a channel, to create a vacated channel for use by a 911 call. In addition, these priorities are utilized to determine whether particular services will be moved or deleted from assigned channels, to create capacity for higher comparative priority services. These various priorities may be individually determined by a service provider to accommodate any particular requirements of a subscriber.

When a CMTS receives a multimedia network access message or other access request having a comparative priority from a CTM, the CMTS determines whether there is a first channel which is available from the plurality of channels, and if so, assigns a first transmission corresponding to the access request to the first channel. When there is no available first channel, the CMTS determines whether there is a second transmission on a second channel which is moveable to a third channel, and if so, reassigns the second transmission to the third channel and assigns the first transmission corresponding to the access request to the second channel. For example, a first CTM may be engaged in a data communication, and may need an additional channel on the same carrier frequency for a voice communication. If all of the time slots (channels) on the carrier frequency are in use, the CMTS may move a transmission from one of the channels to a different carrier frequency, to make an available channel for the first CTM. In the preferred embodiment, certain transmissions, such as fax and TDD, are not moveable to another carrier frequency, while other transmissions, such as voice and data, are freely moveable to other channels and frequencies.

The CMTS also provides that certain types of services are non-blocking, such that when the network is operating at capacity, a lower comparative priority service or transmission will be interrupted or disconnected to allow a higher comparative priority transmission access to the system, such as an emergency (911) telephone call. As a consequence, when there is no available first channel and no second transmission which is moveable, the CMTS determines whether there is a third transmission on an assigned channel having a lower comparative priority than the comparative priority of the access request, and when there is a third transmission, the CMTS removes the third transmission from the assigned channel to form a vacated channel, and assigns the transmission corresponding to the access request to the vacated channel.

Other features of the present invention include the use of the CMTS to delay the third transmission, and following completion of the transmission corresponding to the access request, to allow resumption of the third transmission on the assigned channel. In addition, to maximize data throughput, the CMTS is further configured to reserve a fourth channel for a constant bit rate transmission, and prior to the commencement of the constant bit rate transmission, to allow utilization of the fourth channel for a variable bit rate transmission.

Yet another significant feature of the present invention occurs when a CMTS receives a second access request for a comparatively high bandwidth transmission. When this occurs, the CMTS determines a second plurality of channels consisting of a plurality of time-continuous channels having the comparatively high bandwidth, reassigns a plurality of transmissions, the plurality of transmissions previously assigned to respective channels of the second plurality of channels, to a corresponding plurality of channels which are not time-continuous; and the CMTS then assigns a transmission corresponding to the second access request to the second plurality of channels.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 4 is a block diagram illustrating an exemplary multimedia transmission device utilized in the preferred system embodiment in accordance with the present invention.

DETAILED DESCRIPTION OF THE INVENTION

Figure 1:
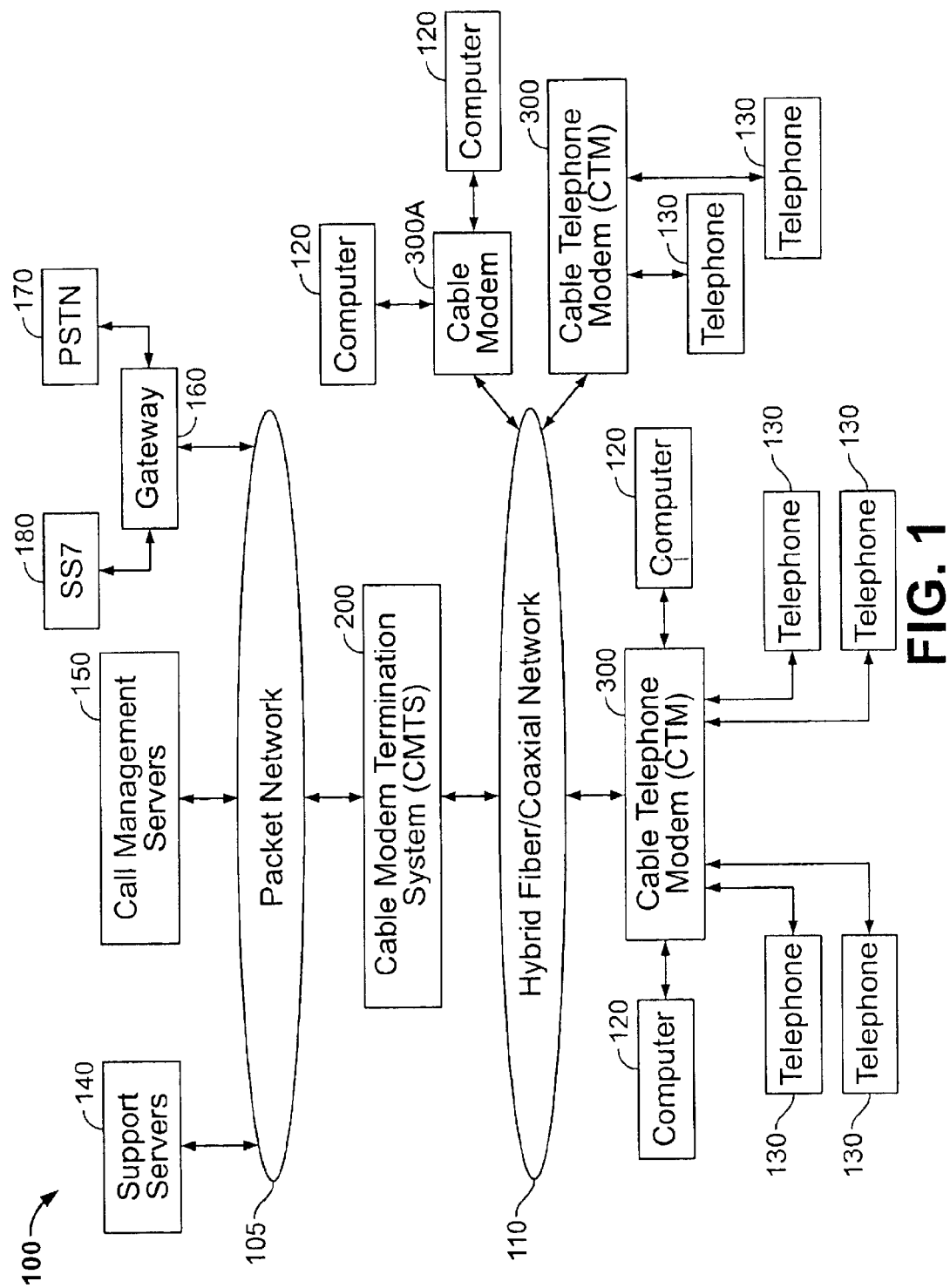
FIG. 1 is a block diagram illustrating a system embodiment for multimedia access network channel management in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus, method and system which provides for access network management, to provide a level or quality of service comparable to the PSTN, while simultaneously providing broadband multimedia transmission capability. Such an apparatus, method and system are provided in accordance with the present invention. The various embodiments of the present invention also provide for a minimal potential blocking of emergency calls and voice calls. In addition, the apparatus, method and system embodiments of the present invention provide for optimal data transmission, including optimal fax and TDD quality. The various embodiments of the present invention are user friendly, user transparent, and capable of implementation within existing hybrid fiber/coax networks.

As discussed in greater detail below, three significant concepts are utilized in the preferred implementation of the present invention. First, all multimedia transmissions (such as data, fax and telephony) from a multimedia transmission device are managed on a total, complete and non-independent basis, with potentially multiple channels allocated and managed on a single carrier frequency for the given multimedia transmission device. For example, if a given multimedia transmission device is currently engaged in a data transmission session and a telephony line goes off hook, a channel for the telephony line will be assigned to the same carrier frequency as the data session in progress. The various embodiments of the present invention utilize a sophisticated searching and priority mechanism to move and manage all such channel usage, in order to provide a vacant channel on a particular carrier frequency, if needed.

Second, multimedia transmission is managed on both a polled and a best efforts basis, with specific polling utilized to prevent blocking, and with an additional best efforts service utilized to maximize system throughput for variable bit rate data transmissions. For example, through either a response to a poll or via contention, a multimedia transmission device may reserve a network channel for a particular type of service, such as telephony. During the time interval between reservation of the service and activation of the reserved service, the reserved channel may be utilized for best efforts services, such as variable bit rate data transmission. As a consequence, as used herein, a "multimedia network access message" is used to generally and collectively refer to two types of requests for channel usage from multimedia transmission devices: first, an access message typically referred to as a best efforts service request, for effectively temporary channel access for variable bit rate transmissions, as mentioned above; and second, an access message for a reserved service, for effectively unlimited channel access for constant bit rate transmissions, such as for telephony service of generally unlimited duration, or guaranteed transmission rates for data services.

Third, various comparative priorities are implemented to effectively ensure that certain types of services, such as 911 emergency access calls, are not blocked due to system capacity, and also to ensure that other services, such as fax, are of optimal quality. For example, to ensure non-blocking of 911 calls, in the event that the system is operating at full capacity, a lower priority service will be removed (or deleted) from a channel, to create a vacated channel for use by a 911 call. In addition, these priorities are utilized to determine whether particular services will be moved or deleted from assigned channels, to create capacity for higher comparative priority services. These various priorities may be individually determined by a service provider to accommodate any particular requirements of a subscriber.

FIG. 1 is a block diagram illustrating a system embodiment 100 for multimedia access network channel management in accordance with the present invention. Referring to FIG. 1, a multimedia termination system or other primary or head-end device, such as a Cable Modem Termination System (CMTS) 200 of the preferred embodiment, bridges multimedia transmission between a packet network 105 and a multimedia network, such as the hybrid fiber/coax ("HFC") network 110 of the preferred embodiment. In addition to bridging multimedia and other data between the HFC network 1and the packet network 105, the CMTS 200 transmits various polls to, and receives multimedia network access messages from, one or more multimedia transmission devices or multimedia modems, such as the cable telephony modems ("CTMs") 300 and cable modems ("CMs") 300A of the preferred embodiment, and assigns each CTM 300 or CM 300A one or more upstream channels for the transmission of voice, fax, video and other data on the HFC network 110.

The CMTS 200, as a preferred embodiment of a multimedia termination system, is discussed in greater detail below with reference to FIG. 3, and the CTMs 300 and CMs 300A, as preferred embodiments of multimedia transmission devices, are discussed in greater detail below with reference to FIG. 4. While the preferred CMTS 200, CTMs 300 and CMs 300A are utilized throughout the following discussion to explain the present invention, it should be understood that reference to a CMTS 200 means and includes any multimedia termination system implementing or embodying the present channel management invention, and that reference to a CTM 300 or CM 300A means and includes any multimedia transmission device, multimedia modem or other customer premise equipment which may request access to or use of a network channel, such as through transmission of a multimedia network access message to a multimedia termination system.

As mentioned above, and as discussed below with respect to FIG. 2, for upstream transmission within the HFC network 110, the system 100 utilizes both FDM and TDMA. As a consequence, as used herein, a channel refers to a particular combination of a selected frequency and a selected time slot, for upstream data transmission. A channel assignment message sent by the CMTS 200 informs a given CTM 300 or CM 300A of the time interval(s) and the frequency (i.e., channel(s)) for such multimedia and other upstream data transmission. In the preferred embodiment, such channel assignment messages are included within a message referred to in the art as a "MAP message".

Continuing to refer to FIG. 1, the packet network 105 may be any general network for the transport of IP data. The packet network 105, for example, may utilize IP, frame relay, ATM, or other transport methods or protocols. Additionally, the packet network 105 generally contains routers (not separately illustrated) for directing data traffic among IP endpoints.

A cable modem (CM) 300A is a multimedia transmission device that bridges one or more data services to the hybrid fiber/coax network 110. The CM 300A is utilized for receiving data from a user device, such as a computer 120, requesting permission to transmit on the HFC network 110, and when granted access, transmitting the user data to the CMTS 200 on one or more assigned channels. Similarly, the CM 300A receives data transmitted from the CMTS 200 and forwards the data to the user device or an interface to the user device. For upstream transmission, a CM 300A (and a CTM 300) utilize a single transmitter and, as a consequence, at any given time may transmit only on one frequency (carrier frequency or carrier).

The cable telephone (or telephony) modem (CTM) 300 is a multimedia transmission device that bridges one or more telephone lines of telephone service and one or more data services to the hybrid fiber/coax network 110. The CTM 300 may be implemented as a CM 300A with an external device providing one or more POTS lines, or may be implemented as a CM 300A with additional embedded POTS line capabilities (as discussed in greater detail below with respect to FIG. 4). Additionally, the CTM 300 may be implemented with only telephony capability and without data service capabilities. The CTM 300 is utilized for receiving data from a user device, such as a computer 120, requesting permission to transmit on the HFC network 110, and when granted access, transmitting the user data to the CMTS 200 on one or more assigned channels. Additionally, the CTM 300 is responsible for receiving an off-hook notification from a user telephone 130, requesting permission to transmit on the HFC network 110, and when granted access, transmitting voice data to the CMTS 200 on an assigned channel. Similarly, the CTM 300 receives data transmitted from the CMTS 200 and forwards the data to either the user device (or an interface to the user device) or the user telephone 140 (or interface to a telephone 140, such as an RJ11 jack). Other functions provided by the CTM 300 in the preferred embodiment are digit collection, audible tone generation, echo cancellation, audio compression, audio expansion, FAX detection, TDD detection and voice band modem detection. The CTM 300 is discussed in greater detail below with respect to FIG. 4. For ease of reference, the various CTMs 300 or CMs 300A, in any of their various configurations, may simply be referred to generally herein as multimedia transmission devices or multimedia modems, and reference to either a CTM 300 or CM 300A should be understood to mean and include the other.

Continuing to refer to FIG. 1, support servers 1represent a variety of devices providing support services for the HFC network 1components. These components and services include, among others, Dynamic Host Configuration Protocol (DHCP), Domain Name Server (DNS), Trivial File Transfer Protocol (TFTP), billing servers, provisioning servers, and sys-log servers. Call management server ("CMS") 150 is a device used to control telephony signaling within the HFC network 110, and performs other functions including digit analysis, the mapping of dialed digits to IP addresses, user authorization of a class of service, and authorizing quality of service. The CMS 150 receives call control messages (such as off-hook and dialed digits) from the CTM 300, and also transmits access network bandwidth reservation requests (such as gate messages) to the CMTS 200 in support of authorized telephone services. The CMTS 200, in turn, reserves a channel (bandwidth) for the subsequent telephony communication. The gateway (or PSTN gateway) 160 provides a bridging function between the PSTN 170, with signaling system seven (SS7) 180, and the packet network 105. The PSTN gateway 160 allows CTM 300 originated telephone calls to be terminated to telephones connected to the PSTN, and allows PSTN originated calls to be terminated on a CTM 300.

Figure 2:
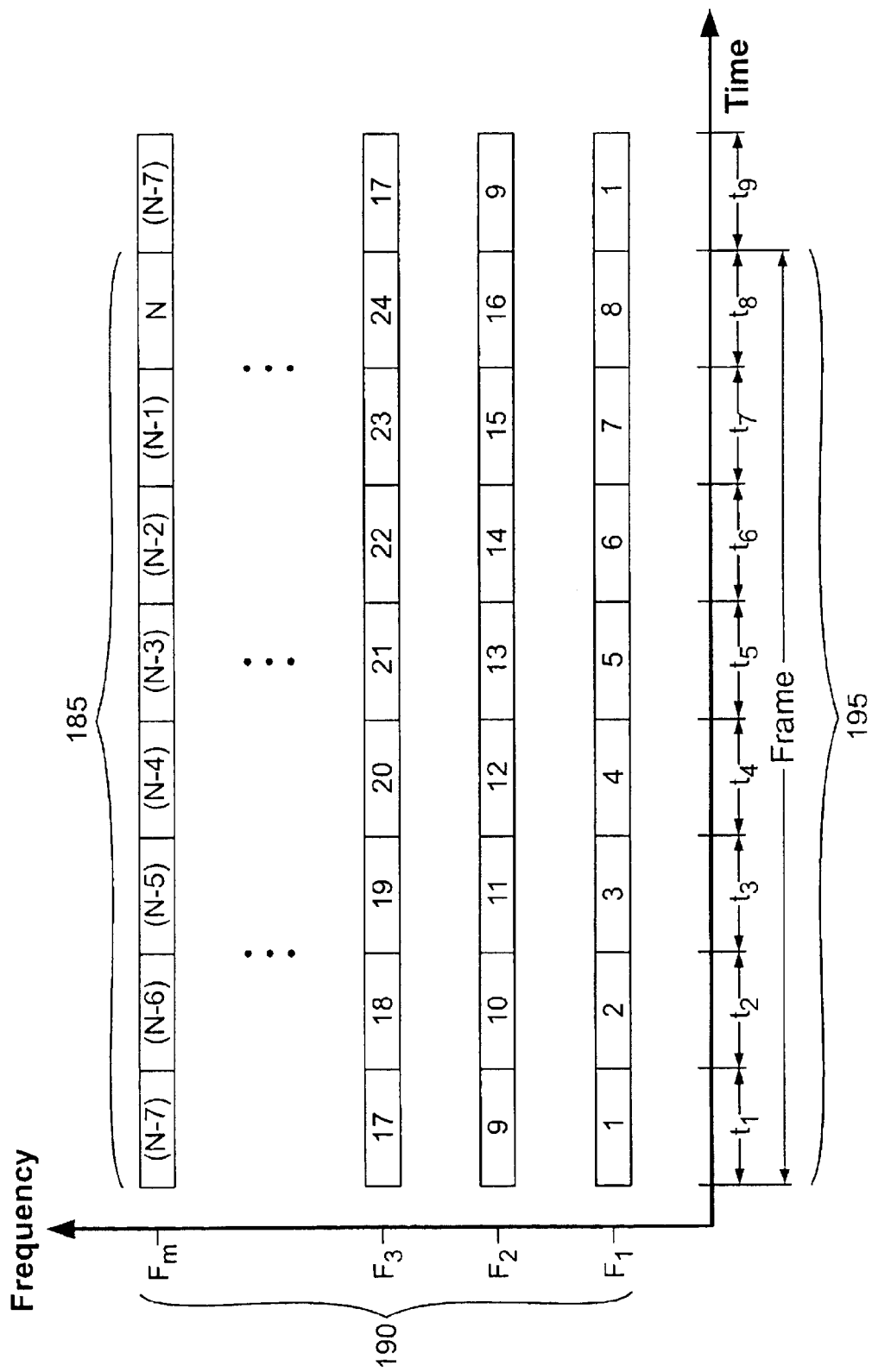
FIG. 2 is a graphical diagram illustrating a plurality of channels utilized for upstream transmission in the preferred system in accordance with the present invention.

FIG. 2 is a graphical diagram illustrating a plurality of "N" channels 185 utilized for upstream transmission in the preferred system 100 in accordance with the present invention. As mentioned above, the HFC network 110 is a full duplex network that utilizes broadcast downstream transmission and a combination of FDM/TDMA for upstream transmission to provide voice and data services. A plurality (numbering "N") of channels (or "cells") 185 are illustrated in FIG. 2, each comprised of a selected frequency 190, such as a frequency selected from frequencies 190 $F_1$ to $F_M$, and of a selected time slot 195. As illustrated, in the preferred system 100 embodiment, eight time slots comprise a frame, and are repeated periodically at an interval referred to as a frame interval. The HFC network 110 uses specific upstream channels or "cells", known as request intervals, for transmitting HFC upstream access request messages from the CTM 300 or CM 300A to the CMTS 200. Transmissions on the request intervals utilize a back-off and retransmission method to resolve contention between CTMs 300 and CMs 300A. In addition to request intervals, specific channels or cells, known or referred to as data intervals, are used for the upstream transmission of data and voice. As illustrated in FIG. 2, these cells are two-dimensional and are composed of a time interval 195 for each transmission and a frequency 190 for each transmission.

Continuing to refer to FIG. 2, the CTM 300 or CM 300A transmit opportunities are a function of both time and frequency. As such, these transmit opportunities can viewed as "cells" in two dimensions. The duration of a transmit opportunity varies as a function of the type of service being provided. Data services are typically characterized by variable data rates. As such, dynamically allocating and de-allocating cells to a CTM 300 or CM 300A for data transmissions support non-periodic data services. Variable length data packets having a length greater than the cell size are supported when multiple cells of a frame are allocated to a single CTM 300 or CM 300A. The assignment of upstream channels (cells) to a given CTM 300 or CM 300A should consider, however, that CTM 300 or CM 300A transmissions, in the preferred embodiment (as illustrated in FIG. 4), are limited to a single frequency at any given time and that the CTM 300 or CM 300A is unable to transmit continuously when the frequency is changing. Additionally, when a single HFC network provides both data and voice services, it is possible to fragment long data packets in to small pieces and transmit the fragmented data packet interleaved with voice transmission. Variable length data packets having a length less than the cell size are supported when individual cells are split into shorter duration sub-cells. These sub-cells can then be dynamically allocated and de-allocated to the CTM 300 or CM 300A for data transmission.

Unlike data services, telephone services typically have a constant data rate. As such, the transmit opportunities associated with a telephone service are repeated periodically at a rate know as the frame rate. Typically for telephone services, cells are sized to carry 10 ms of voice data and allocated periodically at a 10 ms frame rate. Voice transmissions are tolerant to a small amount of transmission jitter typically on the order of 5 ms. As such, while cell size and frame rate may vary for short durations, the average transmission rate should remain constant.

As illustrated in FIG. 2, the number of "N" channels 185 (or cells) for upstream transmission, at any given time, is finite and, as a consequence, upstream transmission from all CTMs 300 and CM 300A is subject to potential capacity limitations. For example, assuming that all upstream channels available for voice traffic have been previously assigned by the CMTS 200 and are in use, in the event a telephone 130 user dials a 911 emergency service, then to prevent blocking of emergency service in accordance with the present invention, one of the active upstream channels must be deactivated and assigned to the 911 emergency service transmission. This may result in an existing call being disconnected while active, but ensures that 911 emergency services is a non-blocking service of the service provider.

Similar problems may arise in the upstream transmission of other information and corresponding channel assignment. For example, a frequency such as $F_1$ may be fully occupied, with a first CTM 300 engaged in a voice transmission in channel one, while other CTMs 300 are engaged in data transmission on the remaining channels 2 through 8. In the event the first CTM 300 also engages in data transmission, given that a CTM 300 or CM 300A may only transmit upstream on one frequency, in order not to block the first CTM 300 from transmitting data on frequency $F_1$ and to give priority to voice traffic for a PSTN quality of service, in accordance with the present invention, the other CTMs 300 transmitting on $F_1$ will be re-assigned and transferred to other channels.

In addition, to accommodate high bandwidth transmissions, a particular CTM 300 or CM 300A may be assigned multiple, time-continuous channels, such as channels 3, 4, 5 and 6 of $F_1$, as illustrated in FIG. 2. In the event the given telephony modem (CTM 300) also goes off hook and is authorized (by CMS 150), the CMTS 200 will reserve another channel on $F_1$ for the subsequent telephony communication. If another channel on $F_1$ is unavailable, a telephony channel and the plurality of these data channels will be found on another, second frequency, potentially by moving other users from that second frequency to other channels.

As mentioned above, the mixed, multimedia services for a given multimedia modem also are managed together, as a group. For example, in the event that a given CTM 300 having two voice calls and a best efforts data transmission need to be moved to another carrier frequency (such as to accommodate a 911 call or a high bandwidth transmission from another CTM 300), then this entire group of services (voice plus data) for the given CTM are managed and moved together, as an aggregate, rather than piecemeal. This total management concept has not been addressed or considered by any of the various standards bodies mentioned above.

As indicated above, data transmission is typically bursty and is generally at a variable bit rate. For typical data transmission, changing frequencies 190 or time slots 195 is not significant, and does not appreciably affect data rates or transmission quality. Conversely, other forms of data transmission, such as fax transmission and TDD, are highly sensitive to such changes, resulting in smears and other visual impact in a received fax, or misspellings in a received TDD. In addition, voice calls exhibit a moderate level of sensitivity to such changes in frequency or time slot, resulting in audible "pop" or "click" noises.

As a consequence, in accordance with the present invention, channel assignments for network 1access are optimized and balanced to: (1) ensure non-blocking of emergency (911) requests (barring a geographic disaster in which the entire capacity of a system 100 is utilized for emergency services); (2) provide a quality of service for voice and two-way video comparable to the de facto standards of the PSTN 170; (3) provide optimal fax and TDD transmission and minimize potential fax and TDD disruption; and (4) provide maximal data transmission throughput within the network 110, including use of multiple, time-continuous channels, and use of best efforts services on reserved but inactive channels, in light of the other system 100 requirements.

Network access is initiated in two ways in the preferred system embodiment, both through a polling mechanism and a contention mechanism. This is implemented in the preferred embodiment by the CMTS 200 issuing polls to each CTM 300 or CM 300A, in which the poll effectively questions each CTM 300 or CM 300A to determine whether it has any transmission requests and, if so, the CTM 300 or CM 300A responds with such a multimedia network access message, such as a dynamic reservation request, to reserve the bandwidth (channel) for the subsequent communication, and to avoid any potential blocking of the comparatively higher priority requests. Second, a CTM 300 or CM 300A, as mentioned above, may also transmit a multimedia network access message in a contention process, such as for a best efforts service request. In fact, one of the significant features of the present invention is the use of a polling service in conjunction with a network which also provides a best efforts service.

As discussed in greater detail below, in accordance with the present invention, channel assignments and dynamic re-assignments are subject to established levels of priority, and are subject to restrictions on channel re-assignments (movement or transfer to another frequency and time slot), and may be configurable and modifiable for the individual subscriber by the system 100 service provider. Such comparative priorities are utilized, in accordance with the present invention, for both reserved services having a constant or minimum data rate and best efforts services (having a variable data rate), and are or may be applicable to any type of service, including emergency access, voice, video, fax, modem, TDD, and data.

For example, in the preferred embodiment, emergency services have a highest or first comparative priority, with any lower priority service subject to cancellation or disconnection in the event of a conflict or contention (and, in theory if not in actual practice, being moveable to allow for other services on a given frequency or time slot). Second, fax and TDD services have a next highest or second level of comparative priority, with any lower priority service subject to cancellation or disconnection in the event of a conflict or contention, and being blockable only by emergency services, but being fixed in their given channel assignments and non-moveable to another channel or channels (frequency and one or more time slots). Third, voice services and symmetric (full duplex) video have a next highest or third level of comparative priority, with any lower priority service subject to cancellation or disconnection in the event of a conflict or contention, and being blockable only by emergency services and fax/TDD services, while being moveable to allow for other services on a given frequency or time slot. Lastly, data services have a fourth and lowest level of priority in the preferred embodiment, being blockable by any higher priority service in the event of a conflict or contention, and being freely movable to any available channel or channels.

It should be understood that such assignments of comparative priority are modifiable, and may be implemented to suit any given needs or requirements of a service provider or a service provider with a particular customer. For example, a particular customer may have significant data needs, such as for on-line services, and comparatively minimal fax/TDD needs. As a consequence, a service provider may configure service to that customer to provide a comparatively higher priority for data services, and a comparatively lower priority for fax services, and so on, and may modify such priorities as customer needs may change over time.

Best effort services, such as best efforts data services, being of variable bit rate, however, may also be temporarily assigned channels for use after they have been reserved for a higher priority use, but before allocation of the channel and actual use, such as during the ringing process of a voice call. More particularly, one of the novel features of the channel management of the present invention is that authorization (of a communication service) and reservation (of the bandwidth for the service) occur together, and occur prior to the actual service itself (such as the voice call or data transmission). For example, if a user dials a called party, before the call is connected, the calling party has been authorized to make the call and bandwidth (a channel) has been reserved for the call. When the call is, in fact, answered, the reserved bandwidth is allocated to and activated for the call. During the interval in which the bandwidth has been reserved but not allocated (activated), such as during the ringing of the called party, best effort services (such as data services) are allowed to use this bandwidth. In addition, comparative priorities may also be assigned to such best efforts services, for example, with lower priority best efforts services being blockable by higher priority best efforts services.

Also in the preferred embodiment, similar priorities are utilized in the downlink (for downstream transmission from the CMTS 200 to any of the CTMs 300 or CMs 300A). An additional priority is utilized for downstream video, which is time sensitive, and for symmetric video (such as a video conference call), assigned a priority comparable to voice communication or a fax communication. In the downlink, priorities are established utilizing preferential queuing of, first, emergency services, followed by downstream video, symmetric video, fax/TDD, voice and data downstream transmission. In general, given the asymmetry of the HFC network 110, with a higher capacity provided in the downstream direction, and given that most services (such as emergency services, voice, fax and TDD) are symmetric, it may reasonably be anticipated that there will be sufficient downstream capacity and any "bottleneck" or limitation which may occur will be in the upstream, lower capacity link.

Figure 3:
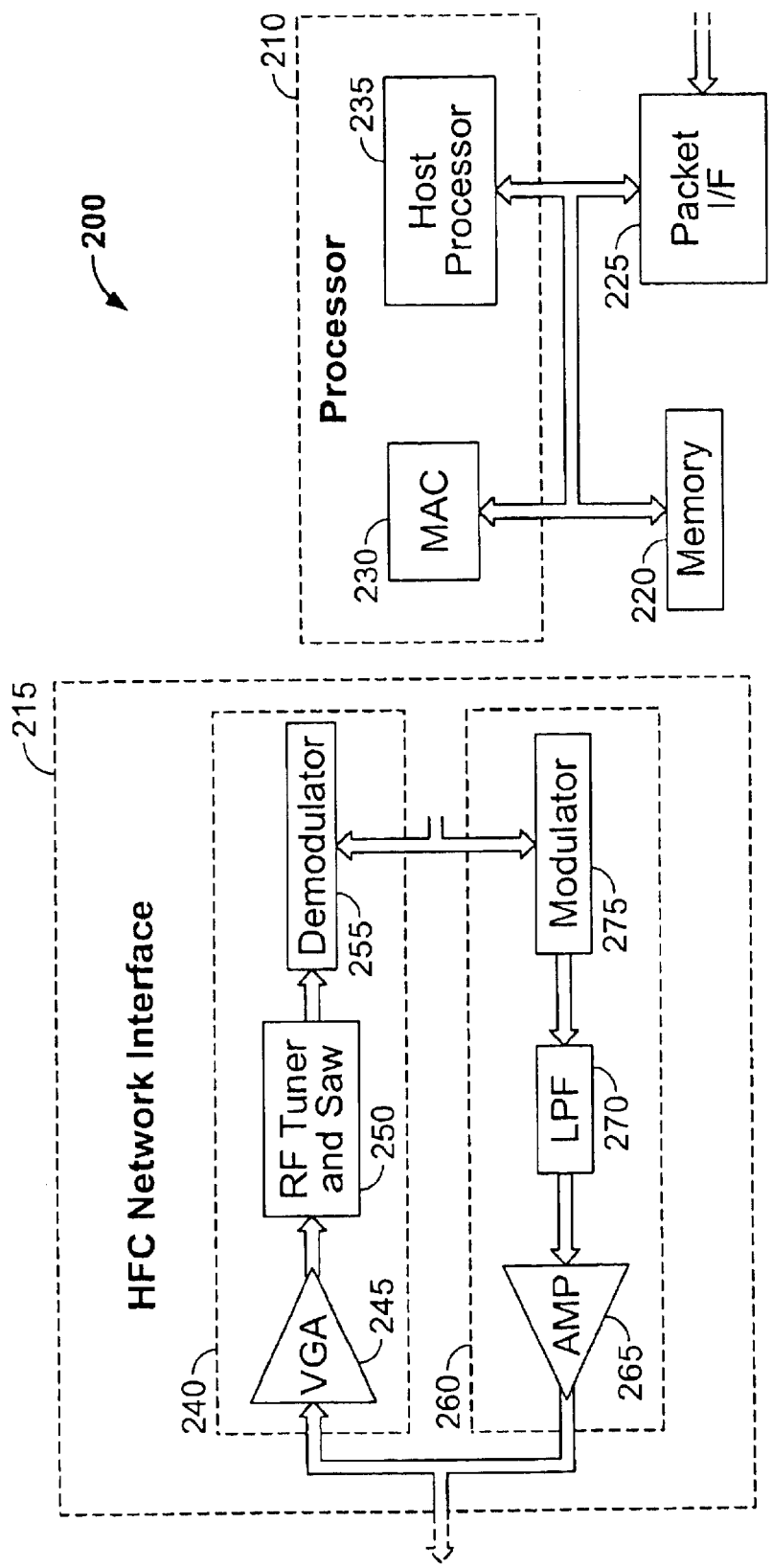
FIG. 3 is a block diagram illustrating an apparatus embodiment for multimedia access network channel management in accordance with the present invention.

FIG. 3 is a block diagram illustrating a preferred multimedia termination system or apparatus embodiment, illustrated as a CMTS 200, for multimedia access network channel management in accordance with the present invention. In the preferred embodiment, the apparatus is implemented in its entirety within a multimedia termination system such as a CMTS 200. The apparatus 200 includes a network interface 215, a processor 210, a memory 220, and a packet interface 225. The network interface 215 is utilized to receive and transmit information and other data, control messages, polls, and other pertinent information, to and from the HFC network 110, and is described in greater detail below. The packet interface 225 is also utilized to receive and transmit information and other data, control messages, and other pertinent information, but to and from the packet network 105. The memory 220 is preferably one or more integrated circuits, such as random access memory (RAM) in any of its various forms, FLASH memory, and dynamic random access memory (DRAM), but also may be a magnetic hard drive, an optical storage device, or any other type of data storage apparatus. The memory 220 is used to store information obtained during the access network channel management process, as discussed below, and also may store information pertaining to program instructions or configurations, if any (discussed below).

Continuing to refer to FIG. 3, the processor 210 (and processor 310 of FIG. 4) may include a single integrated circuit ("IC"), or may include a plurality of integrated circuits or other components connected, arranged or grouped together, such as microprocessors, digital signal processors ("DSPs"), custom ICs, application specific integrated circuits ("ASICs"), field programmable gate arrays ("FPGAs"), associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, or some other grouping of integrated circuits which perform the functions discussed above and also discussed in detail below with reference to FIGS. 5–6, with associated memory, such as microprocessor memory or additional RAM, DRAM, SRAM, MRAM, ROM, EPROM or $E^2PROM$. The processor 210 with its associated memory may be configured (via programming or hard-wiring) to perform the methodology of the invention, as discussed above with reference to FIGS. 1–2 and as discussed below with reference to FIGS. 3 and 5–6. For example, the methodology may be programmed and stored, in the processor 210 with its associated memory (and/or memory 220) and other equivalent components, as a set of program instructions (or equivalent configuration or other program) for subsequent execution when the processor 210 is operative (i.e., powered on and functioning). Equivalently, when the processor 210 with its associated memory and other equivalent components are implemented in whole or part as FPGAs, custom ICs and/or ASICs, the FPGAs, custom ICs or ASICs also may be designed, configured and/or hard-wired to implement the methodology of the invention. In the preferred embodiment, the processor 210 is implemented as one ASIC IC and one microprocessor IC for, respectively, a media access control ASIC ("MAC") 2and a host processor 235, which are respectively configured through gate layout/hard wiring and program instructions (stored internally and within memory 220) to implement the methodology of the present invention. It should also be noted that the various components of the CMTS 200 (FIG. 3) and the CTM 300 (or CM 300A) (FIG. 4) are described in functional blocks, and may be implemented as known in the art via one or more of any number of devices or ICs.

Continuing to refer to FIG. 3, the CMTS 200, through the network interface 215, typically transmits RF signals in the frequency range of approximately 50 to 750 MHz and receives signals in the range of approximately 5 to 40 MHz. The CMTS 200 RF input and RF output are connected to the HFC network 110 using a diplex filter (not shown in FIG. 3). The diplex filter is typically external to the CMTS 200 such that the RF output frequency can be set to an unused frequency, such as an unused television channel.

Within the network interface 215, the CMTS 200 includes a plurality of receivers 240, one for each upstream frequency, composed of a variable gain amplifier (VGA) 245, an RF Tuner and SAW filter 250, and a demodulator 255. The number of receivers 240 included within a CMTS 200 may vary based on the exact upstream bandwidth requirements of the system 100, with a typical CMTS 200 including one to eight receivers 240, with one such receiver 240 illustrated in FIG. 3, and with an internal RF splitter (not illustrated) for delivering RF input signals to each additional receiver 240. The CMTS 200 may also be configured to accept several RF input signals and the RF splitter also may be external to the CMTS 200.

The VGA 245 component of the CMTS 200 receiver 240 is used to adjust the amplitude of the RF input signal, with the amplified signal delivered to an RF tuner and SAW filter assembly 250. The RF tuner and SAW filter assembly 250 down convert the RF signals to intermediate frequencies (IF), involving mixing the RF input signal and filtering the resultant mixed signal with a SAW filter, producing IF signals to the demodulator 255. The demodulator 255 produces the recovered bit stream from the IF input signal, and uses well-known techniques to recover the bit stream, including analog to digital conversion, receiver amplitude correction, echo cancellation, timing tracking, frequency correction, and slicing.

Within the network interface 215, the CMTS 200 includes a transmitter 260, including a modulator 275, a low pass filter 270, and an amplifier 265. The modulator 275 preferably performs digital quadrature amplitude modulation ("QAM") on the bit stream for transmission from the MAC 230, and may also include a pre-equalization function. After digitally modulating the transmit bit stream, the modulator 275 converts the stream to the analog domain using a digital to analog converter, which is then filtered using a low pass filter (LPF) 270 to remove unwanted harmonic artifacts. After removing the unwanted harmonics, the analog signal is amplified using a power amplifier (PA) 265. The output of the PA 265 is then sent to a diplex filter (mentioned above) that provides an interface to the coax cable of the HFC network 110.

Within the processor 210, the CMTS may utilize several MAC 230 devices to support any number of upstream channels. The MAC 230 accepts the recovered bit stream from the demodulator 255, performs error detection and correction on the recovered bit stream, decrypts (if encrypted), and formats the bit stream into blocks for delivery to the host processor (microprocessor) 235. For transmission, the MAC 230 also accepts (and optionally encrypts) data to be transmitted from the host microprocessor 235. Additionally, the MAC 230 sends upstream timing and control information to the modulator 275.

The host processor 235 is a general-purpose microprocessor used to process upstream and downstream data. Typically, this host processor 235 performs tasks associated with bridging Internet Protocol (IP) data between the packet interface 225 and the HFC network 110. The host processor is also directly involved in managing access network resources and performing the channel management process of the present invention. As discussed in greater detail below with respect to FIGS. 5 and 6, to support access network channel management, the host processor receives multimedia network access messages and control messages in several forms. As mentioned above, the multimedia network access messages are generally of two types: (1) best effort service requests ("BES-REQ"), for upstream transmission of a variable bit rate (which may be interleaved with other services, such as during the interval between reservation and activation of reserved services); and (2) dynamic access messages, for reserved services having a constant bit rate on an assigned channel, and for modifications of those reserved services. In the preferred embodiment, these dynamic access messages include dynamic service addition request messages ("DSA-REQ"), dynamic service change request messages (DSC-REQ), dynamic service deletion request messages (DSD-REQ), gate addition request messages, and gate deletion request messages. The host processor 235 also transmits control messages to the CTM 300 or CM 300A, including a transmission control message known as an upstream map message ("MAP") that contains transmission information such as channel assignments for the upstream, and an upstream channel change message ("UCC-REQ") that indicates the CTM 300 or CM 300A should transmit on a new upstream frequency. In support of host processor operations, the processor 235 uses both volatile and non-volatile memory 220, with non-volatile information and instructions for the host processor 235 stored in FLASH memory, and with volatile information and instructions for the host processor 235 stored in dynamic random access memory (DRAM).

Continuing to refer to FIG. 3, the packet interface 225 provides an interface between the host processor 235 and the packet network 105. The exact functions provided by the packet interface 225 are dependent on specifics of the packet (IP) network 105, and may include functions applicable to 10 or 100 baseT Ethernet, IP over SONET, or ATM over SONET, for example.

FIG. 4 is a block diagram illustrating a representative or exemplary multimedia transmission device or multimedia modem, such as a cable telephony modem (CTM) 300 utilized in the preferred system embodiment in accordance with the present invention. As mentioned above, for purposes of the present invention, the only difference between the cable modem (CM) 300A and the CTM 300 is the provision of telephony signaling and interfaces (CODEC and SLIC 360) within the CTM 300. Of particular importance for the present invention, the CTM 300 and CM 300A detect user activities at the interfaces (data interface 325 and CODEC/SLIC 360), and transmit appropriate messaging to the CMTS 200, such as different types of multimedia network access messages.

For example, a CTM 300 may detect a user going off hook, supply dial tone to the appropriate CODEC/SLIC 360, and receive dialed digits, such as 911 or an ordinary directory number, or receive fax or TDD tones and signals. The CTM 300 in turn generates and transmits appropriate messaging (multimedia network access messages) to the CMTS 200, typically via the CMS 150. As a consequence, the CMTS 200 has information pertaining to the type of access needed prior to granting or allocating such access, and may make priority determinations and channel assignments accordingly. Continuing with the example, the CTM 300, having received 911 as dialed digits, may transmit appropriate messaging to the CMS 150 and CMTS. 200, and the CMTS 200, in accordance with the present invention, will immediately provide access, assign a high priority channel and, if needed, move (reassign) or disconnect (remove) a previous user from the channel.

Referring to FIG. 4, the CTM 300 or other multimedia transmission device includes a network interface 305, for multimedia transmission and reception, a processor 310 (as previously defined for processor 210 in FIG. 3), a memory 320 having various forms (such as RAM, DRAM and FLASH), a data interface 325 (such as for communication with a subscriber computer, a video device, or another multimedia device), and one or more CODEC/SLIC 360 units (for communication with one or more subscriber telephones). Additional interfaces (not illustrated) may be added for any corresponding multimedia device.

Continuing to refer to FIG. 4, for multimedia reception, a diplex filter 345 separates the input RF signals in the frequency range of 50 to 750 MHz from the output signals (for transmission) and provides the input RF signals to the RF tuner and SAW filter assembly 350. The tuner and SAW filter assembly 350 down convert the RF signals to IF frequencies, by mixing the RF input signal and filtering the resultant mixed signal with a SAW filter, producing IF signals that are delivered to the demodulator 355. The demodulator 355 produces the recovered bit stream from the IF input signal, utilizing well-known techniques such as analog to digital conversion, receiver amplitude correction, echo cancellation, timing tracking, frequency correction, and slicing.

For transmission on the HFC network 110, the modulator 375 performs digital quadrature phase shift keying ("QPSK") or QAM modulation on the bit stream from the MAC 330, and may also include a pre-equalization function. After digitally modulating the transmit bit stream, the modulator 365 converts the stream to the analog domain using a digital to analog converter, which is filtered using a low pass filter (LPF) 370 to remove the unwanted harmonic artifacts, and amplified using a variable gain power amplifier (PA) 375. The output of the PA 375 is then sent to a diplex filter 345 that provides an interface to the coax cable or other transmission media.

The processor 310 includes a MAC 330, a host processor 335, and a digital signal processor ("DSP") 340. The MAC 330 is preferably implemented as an ASIC and accepts the recovered bit stream from the demodulator 355, performs error detection and correction on the recovered bit stream, decrypts (if encrypted), and formats the bit stream into blocks for delivery to the host processor (microprocessor) 335. For transmission, the MAC 330 also accepts (and optionally encrypts) data to be transmitted from the host microprocessor 335. Prior to delivering the transmit data to the modulator 365, the MAC 330 adds a cyclic redundant code (CRC) to the transmit data block. Additionally, the MAC 330 sends data to the modulator 365 based on timing information extracted from the recovered bit stream.

The host processor 335 is also a general-purpose microprocessor used to process upstream and downstream data. Typically, this processor performs tasks associated with bridging Internet Protocol (IP) data between the data interface 325 and the HFC network 110. The host processor is also involved in requesting access to network resources. In the preferred embodiment, the multimedia network access messages have several different forms, including best effort service request messages (BES-REQ), dynamic service addition request messages (DSA-REQ), dynamic service change request messages (DSC-REQ), and dynamic service deletion request messages (DSD-REQ). The CTM 300 or CM 300A also receives control messages from the CMTS 200 and performs corresponding actions. The control messages include a transmission control message known as an upstream map message (MAP) that contains transmission information (channel assignments) for the upstream, and an upstream channel change message ("UCC-REQ") that indicates the CTM 300 or CM 300A should transmit on a new upstream frequency.

The host processor 335 is also involved in sending telephone call control messages such as on-hook, off-hook, and dialed digits to the CMS 150. Based upon these call control messages, the CMS 150 sends gate messages to the CMTS 200. Additionally, the host processor 335 interfaces to the DSP 340 and controls the DSP 340 functions. A special feature of the host processor 3is its ability to issue a dynamic service change request (DSC-REQ) message when a FAX or TDD device is detected by the DSP 340. The host processor 335 uses both volatile and non-volatile memory 320, with non-volatile information and instructions for the host processor 335 being stored in FLASH memory 320C, and with volatile information and instructions for the host processor 335 being stored in dynamic random access memory (DRAM 320B). Not separately illustrated in FIG. 4, the host processor 335 may also have a control interface to the various CODEC/SLIC units 360, for communicating control information, such as for hook switch detection.

The DSP 340 is a special purpose microprocessor and performs digital signal processing (DSP) functions on voice signals, including voice data compression and expansion, voice echo cancellation and conversion to and from PCM data representation. Additionally, the DSP 340 provides a variety of tone generation and detection features such as dial tone synthesis, FAX detection, TDD detection and DTMF detection. Volatile information and instructions for the DSP 3is stored in random access memory (RAM 320A) of memory 320.

It should be understood that the various memory 3and processor 310 configurations may have various forms and various connections (such as a connection of the host processor 340 to FLASH 320C and DRAM 320B components, and a connection of the DSP 340 to RAM 320A). As a consequence, such connections are illustrated more generally, utilizing bus 380, with appropriate configurations determined by a specific implementation of a multimedia transmission device.

A CODEC and SLIC 360 is provided for each line of telephone service, and convert digital voice signals to and from the analog domain. The CODEC interfaces the DSP 340 to the subscriber line interface (SLIC), which translates voice signals suitable for the CODEC interface to those suitable for interfacing to a telephone 130. Additionally, the SLIC produces the signals necessary to ring a telephone.

The data interface 325 may be various input and output devices to interface to a device such as a computer, and may include circuitry necessary for interfacing to a 10 or 100 baseT Ethernet or a universal serial bus (USB).

Figure 5A:
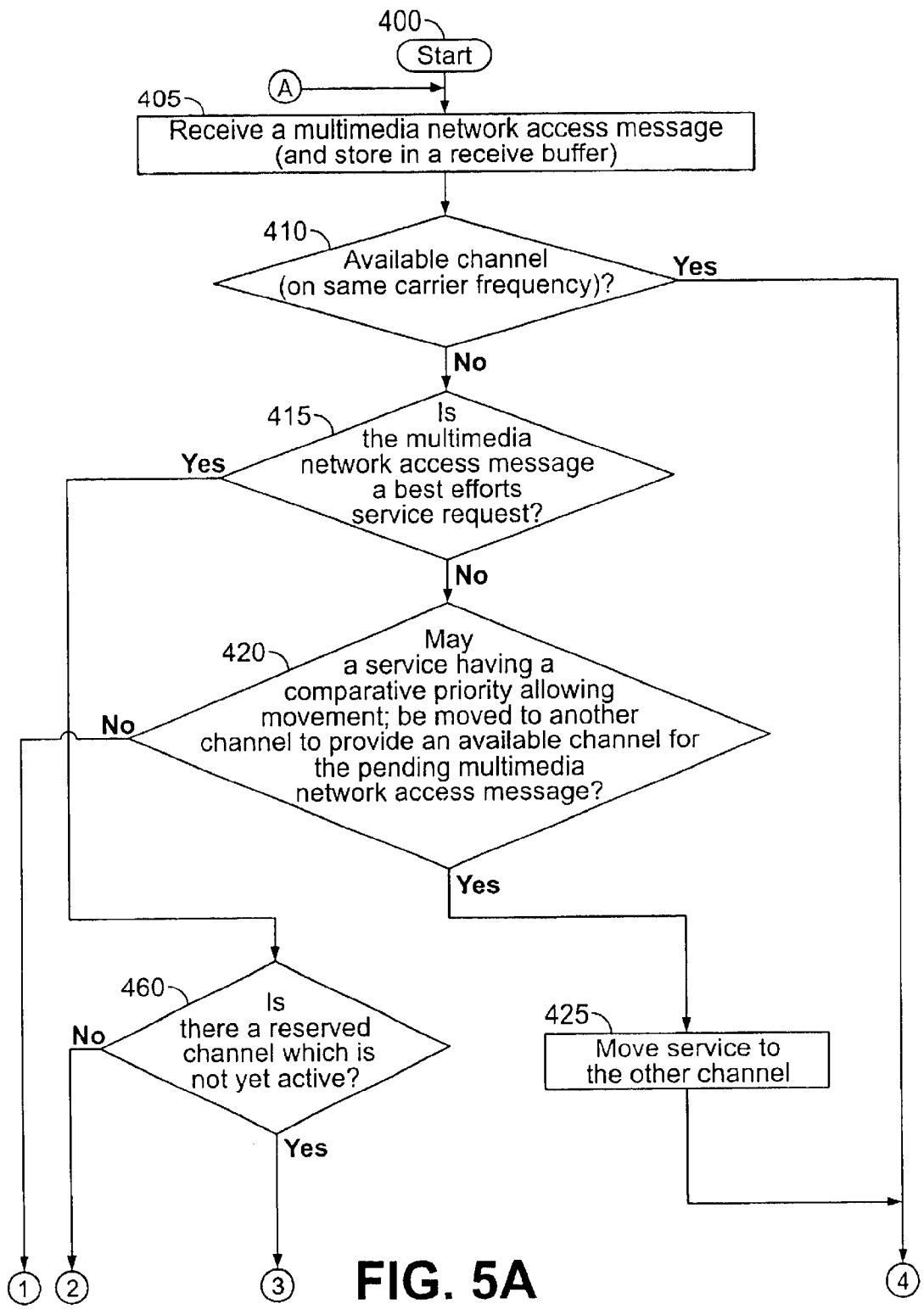
FIG. 5 is a flow diagram illustrating a method embodiment for multimedia access network channel management in accordance with the present invention.
Figure 5B:
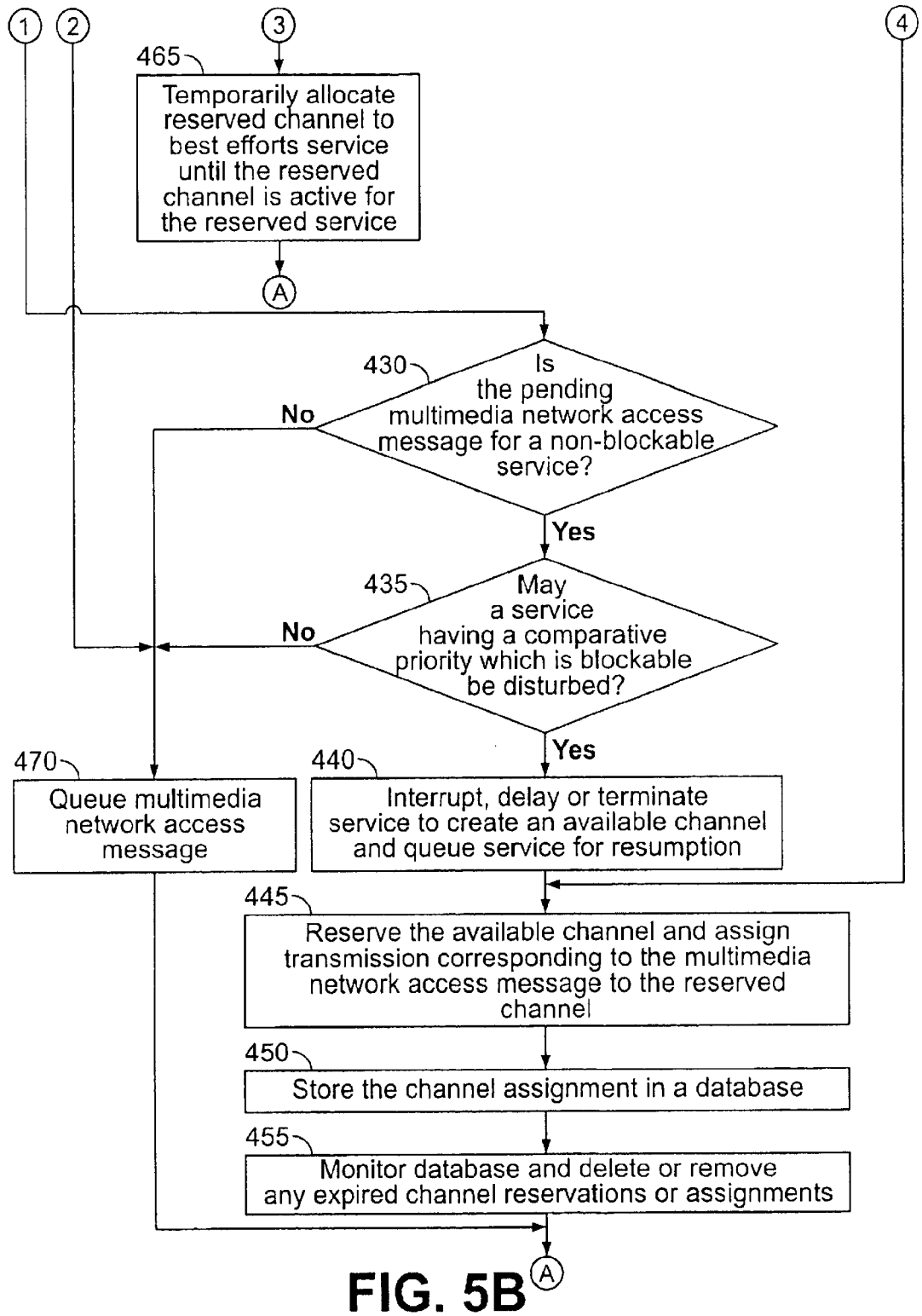
Figure 6A:
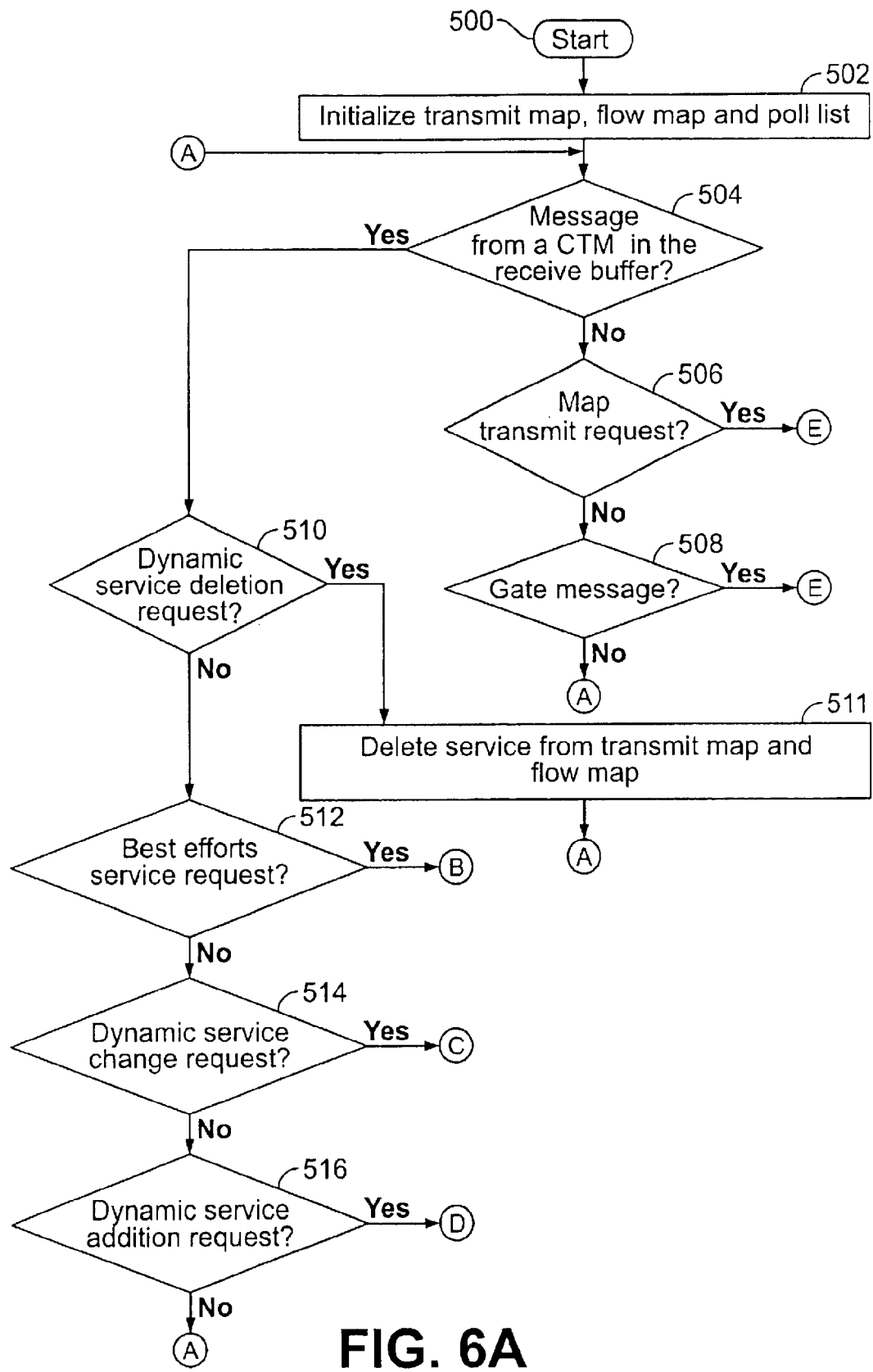
FIG. 6 is a flow diagram illustrating a preferred method embodiment for multimedia access network channel management in accordance with the present invention.
Figure 6B:
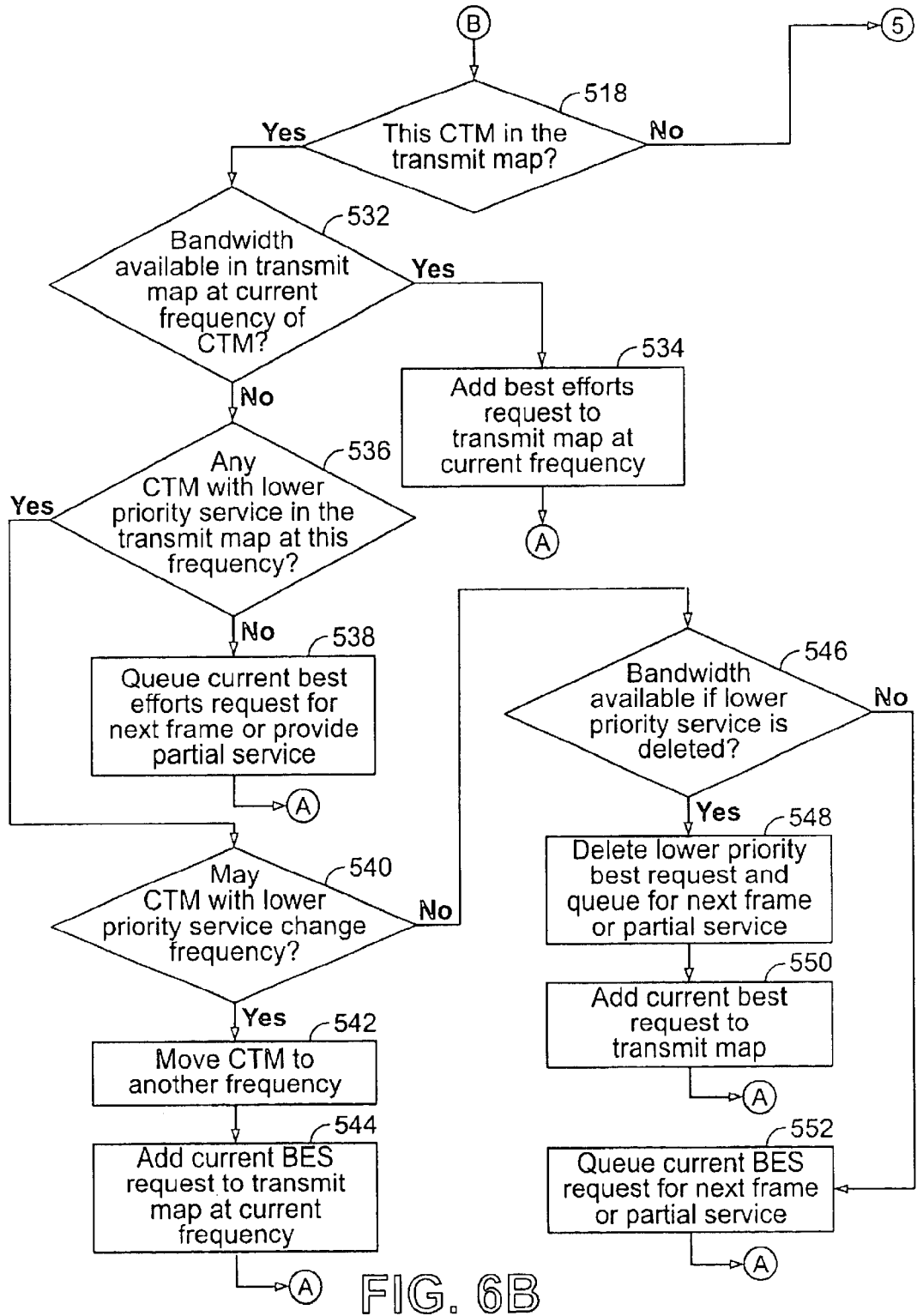
Figure 6C:
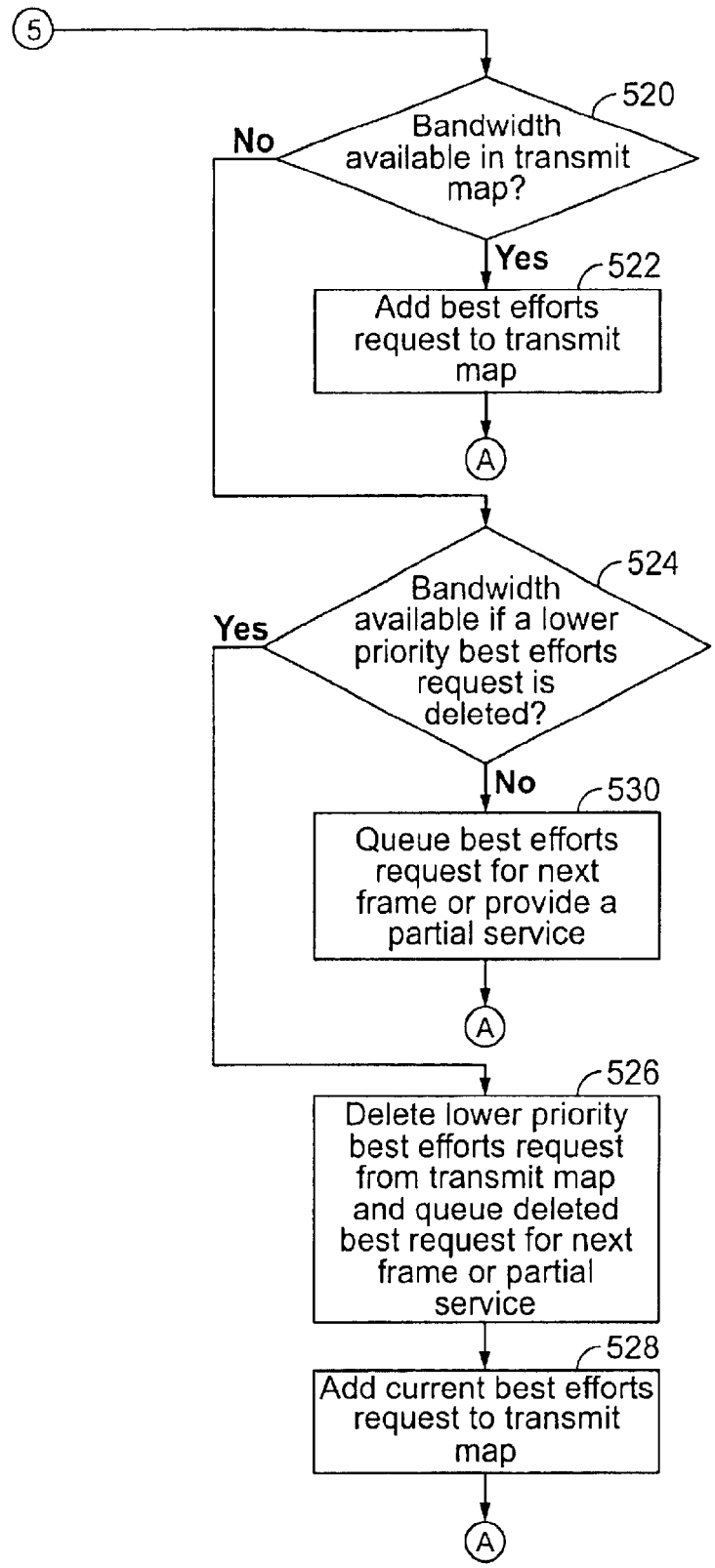
Figure 6D:
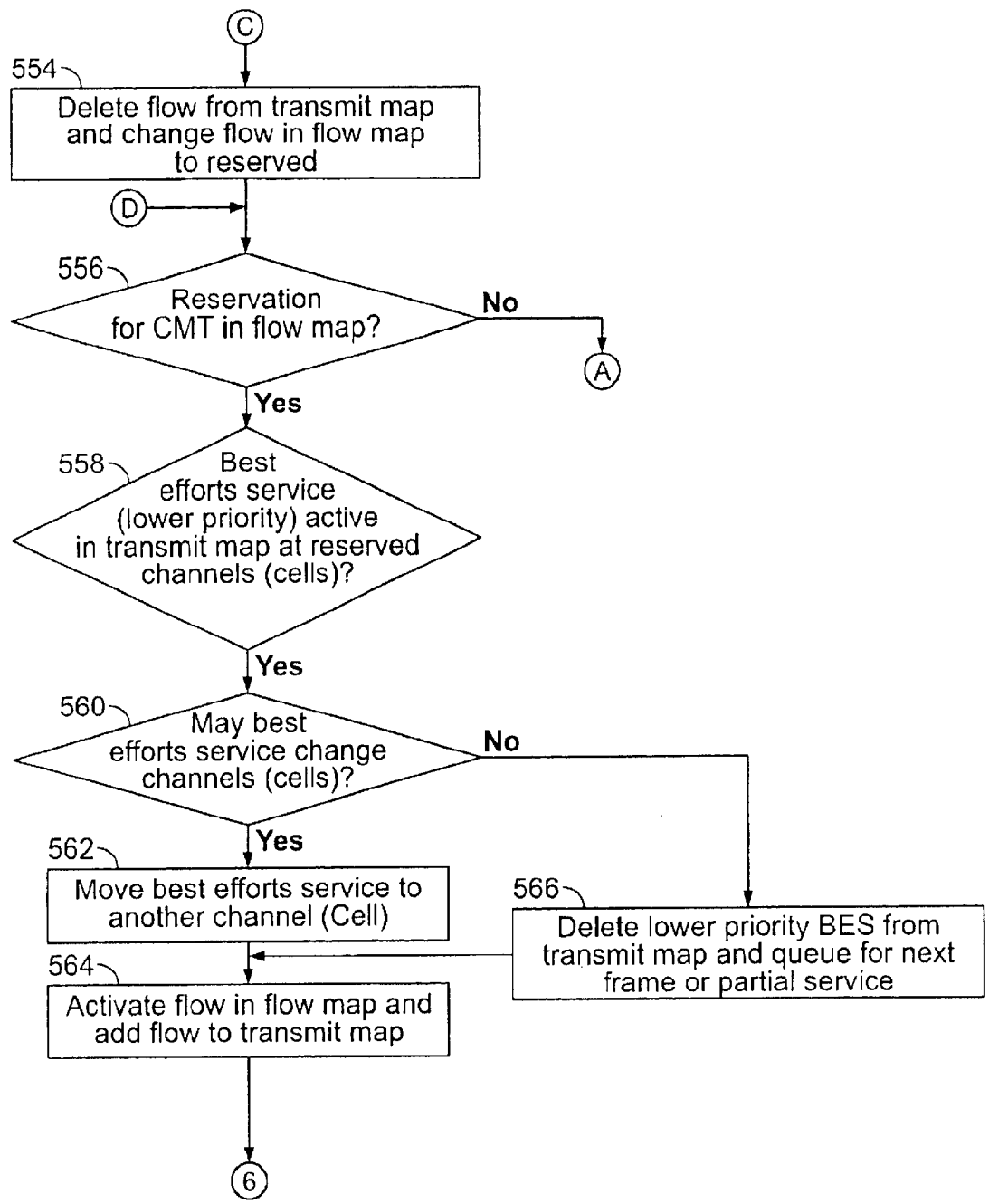
Figure 6E:
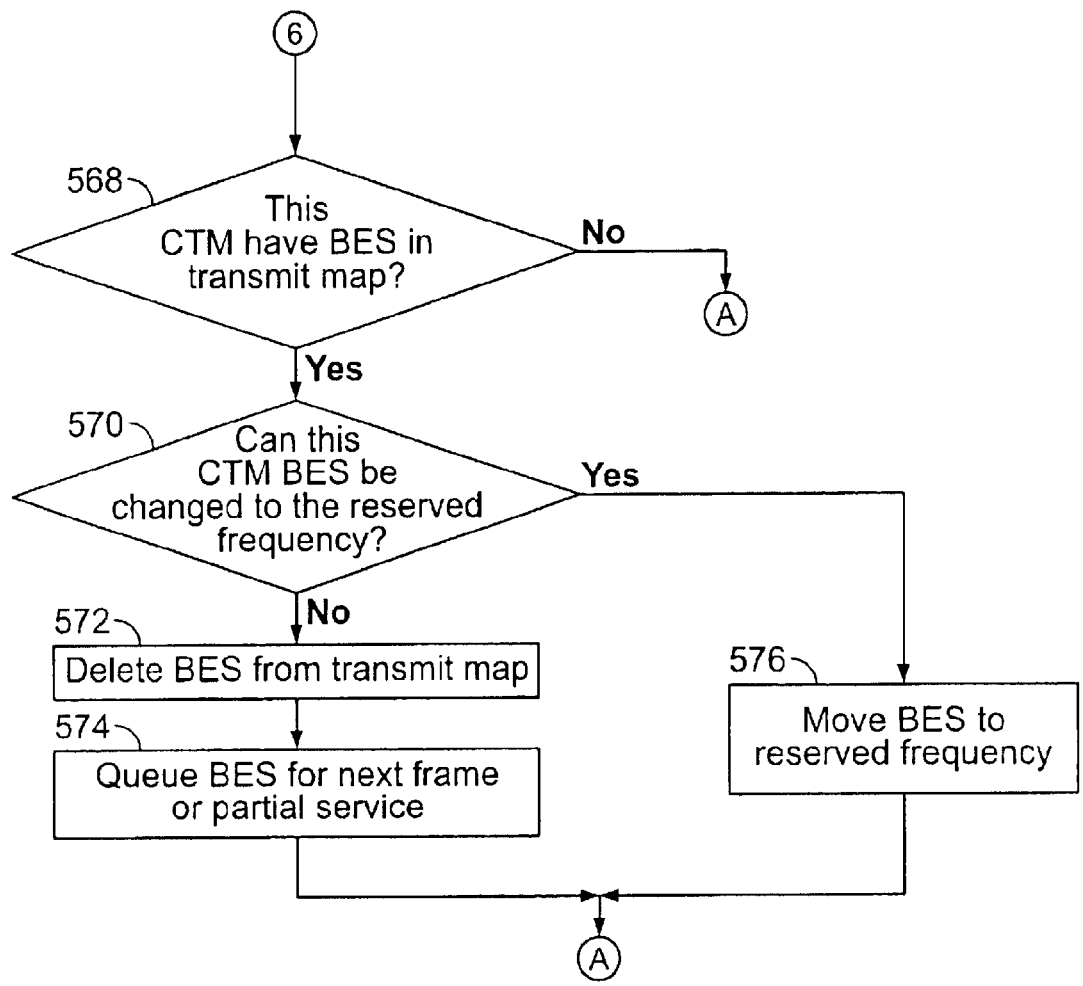
Figure 6F:
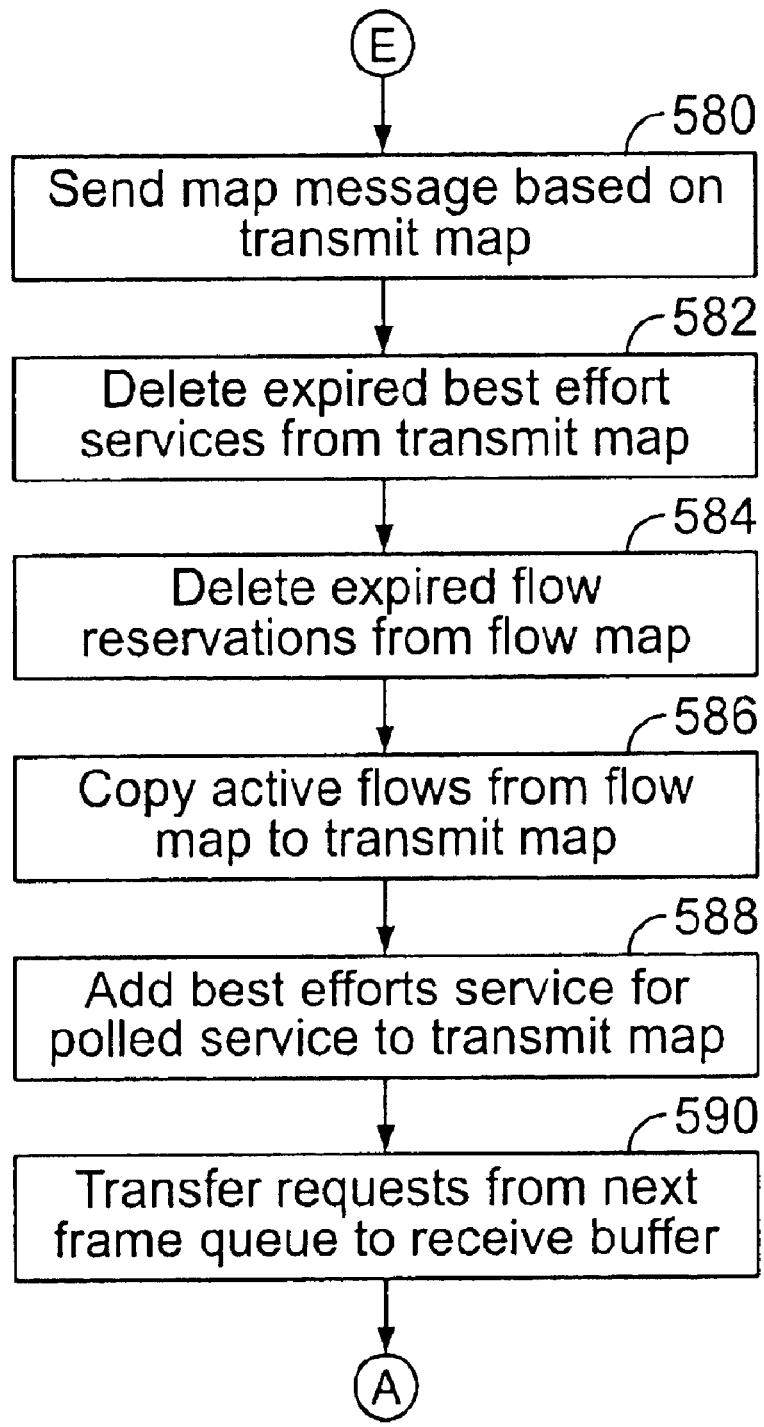
Figure 6G:
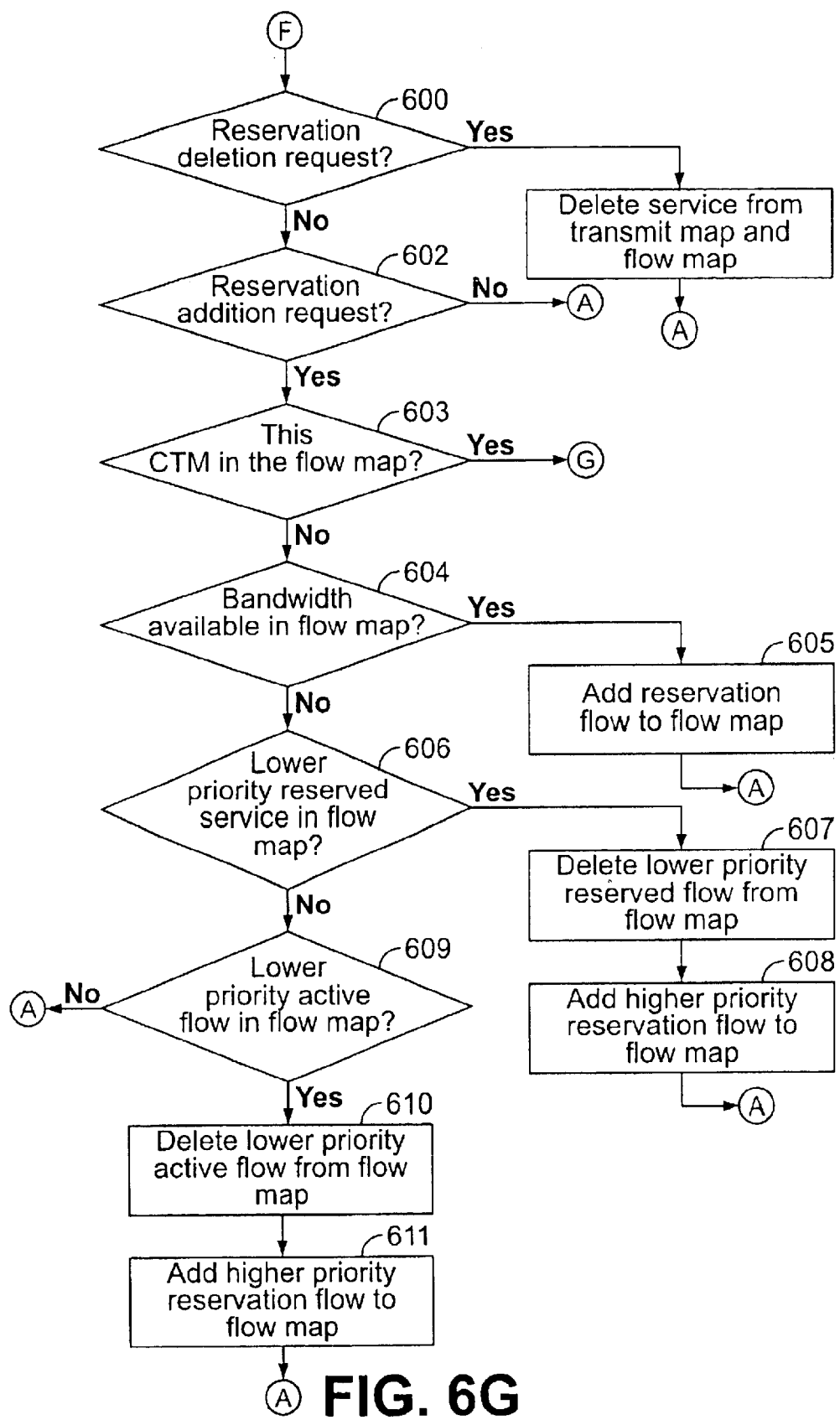
Figure 6H:
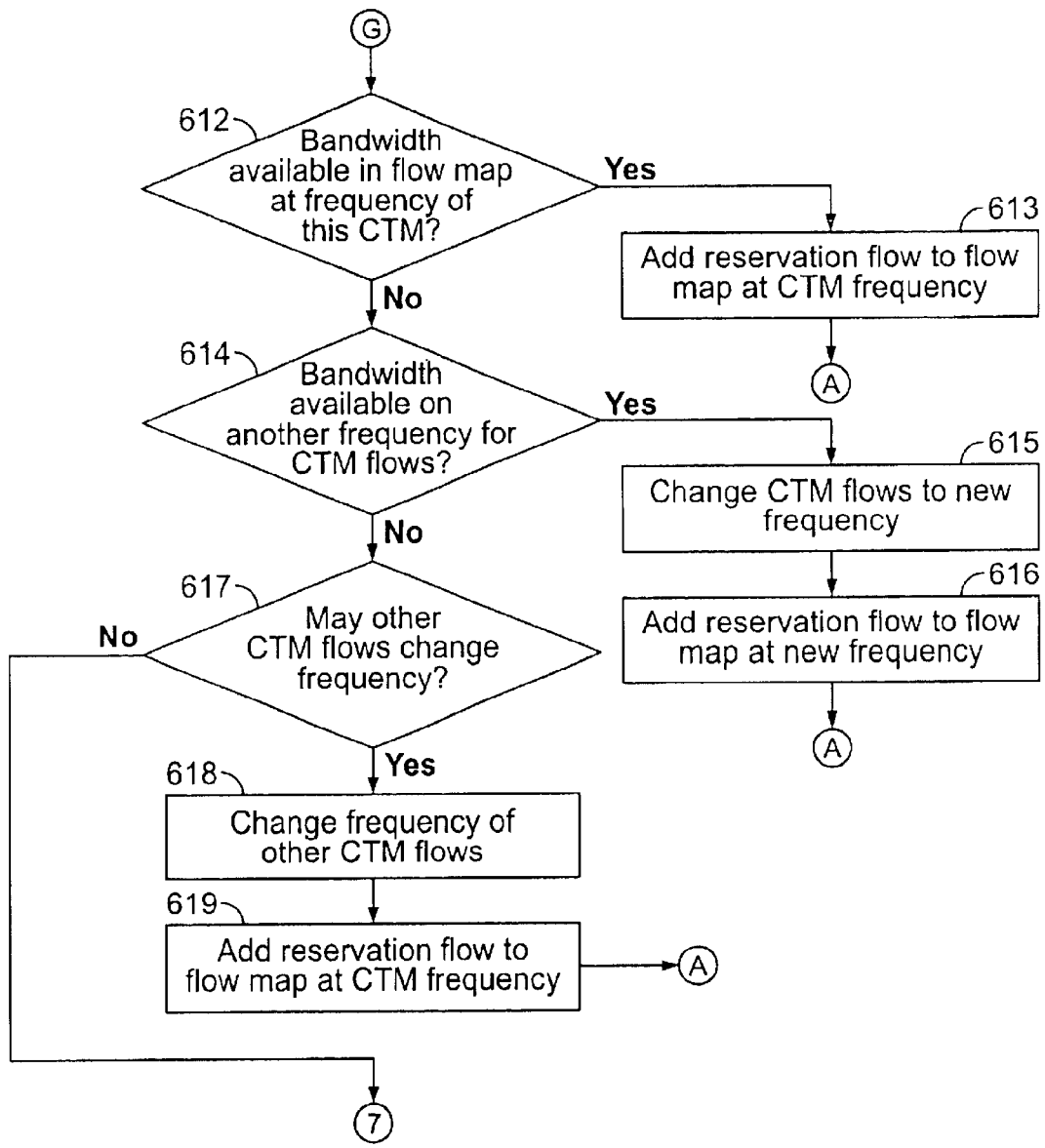
Figure 6I:
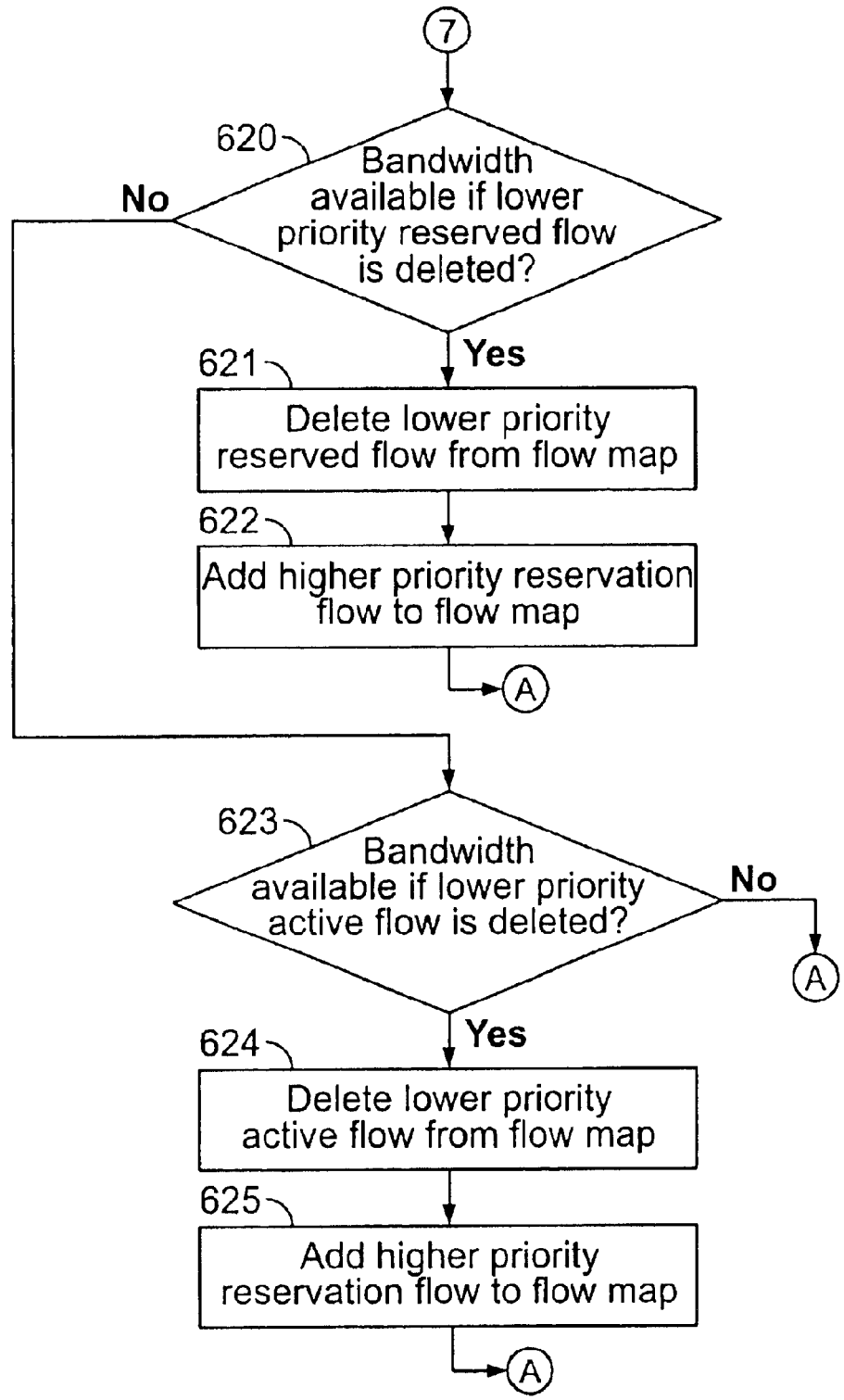

FIG. 5 is a high-level flow diagram illustrating a method embodiment for multimedia access network channel management in accordance with the present invention. The method runs as a platform within a multimedia termination system such as a CMTS 200, and begins, start step 400, with the reception of various multimedia network access messages requesting network services, such as best efforts service requests or dynamic service authorization or access requests (which are preferably stored in a receive buffer (part of memory 220)), step 405. The various multimedia network access messages may be in response to a poll from the multimedia termination system, or may be transmitted without a poll (with a contention mechanism to resolve potential conflicts, as discussed above). As mentioned above, the various multimedia network access messages include: requests to transmit data (upstream) from the CTMs 300 and CMs 300A, such as for data files and two-way video, which may be either for reserved (dynamic) services or for best efforts services; dynamic service authorizations, from the CTMs 300 via the CMS 150 (as gate messages), generally for telephony services, which may be for voice, video, emergency access, fax and TDD services; and other dynamic access messages (such as to add a dynamic service, or change a dynamic service (such as from voice to fax).

As illustrated in FIG. 5, the method of the present invention implements channel management, for upstream transmissions, with three significant features. First, a best efforts service mode is provided in conjunction with a polling methodology, to provide minimal blocking of reserved services, and to interleave best efforts services on reserved but not yet active channels, to maximize data throughput. Second, overall channel management includes management of all multimedia services from a given multimedia transmission device or multimedia modem, which is generally constrained (via one transmitter) to transmit on a single carrier frequency at a given time. As a consequence, channels are managed, and moved (allocated and/or re-assigned) between and among the various multimedia transmission devices, to accommodate multiple transmissions from any one device. Third, channels are managed with regard to various comparative priorities, to minimize blocking, and to minimize unwanted movement of services to other frequencies.

The pending multimedia network access messages in the receive buffer at any given time may include a plurality of multimedia network access messages of varying types and varying comparative priorities. In the preferred embodiment, each multimedia network access message has a corresponding comparative priority, forming or creating a plurality of corresponding, comparative priorities which include: (1) a first and highest priority corresponding to requests for access to emergency services, such as 911 emergency services, with first priority being generally non-blockable but moveable; (2) a second priority comparatively lower than the first priority, with the second priority corresponding to facsimile transmission or TDD transmission, which is blockable but non-moveable; (3) a third priority comparatively lower than the second priority, with the third priority corresponding to voice transmission or to video transmission, which is blockable and moveable; and (4) a fourth priority comparatively lower than the third priority, with the fourth priority corresponding to data transmission and other best effort services, which are also blockable and moveable. Also as indicated above, these various priority assignments may be freely modified and determined by the service provider and/or the subscriber, with different types of services having priorities which may be configured or customized for the preferences of the subscriber or service provider.

Following reception of one or more multimedia network access messages, in step 405, the method then determines whether the pending request has the proper authorization and whether there is an available channel to accommodate the pending network access request, step 410. If the multimedia transmission device is currently engaged in a transmission on a given frequency, step 410 will include a determination of whether another channel is available on the same frequency to accommodate the pending multimedia network access message. When there is an available channel (on the same frequency, if the CTM 300 is already assigned to a channel) to accommodate the pending multimedia network access message in step 410, the method proceeds to step 445 to reserve the available channel (if the multimedia network access message is for a reserved service) and assign a transmission corresponding to the multimedia network access message to the available channel, as discussed in greater detail below.

When there is no available channel (on the same frequency, if the CTM 300 is already assigned to a channel) to accommodate the pending multimedia network access message in step 410, the method first determines, step 415, whether the pending multimedia network access message is a best efforts service request. If the pending multimedia network access message is a best efforts service request in step 415, the method proceeds to step 460 to determine whether there is a reserved channel that is not yet active, to which the best efforts service may be assigned. When there is a reserved channel that is not yet active in step 460, the method temporarily allocates that reserved channel to the best efforts service, until that channel is active for the reserved service, step 465. When there is no reserved channel that is not yet active in step 460, the method queues the pending multimedia network access message, step 470, for subsequent fulfillment if and when a channel is available. (It should be noted that best efforts services in the preferred embodiment are also subject to movement and deletion of other best efforts services having a lower comparative priority, as discussed in greater detail below).

When there is no available channel (on the same, first frequency, if the CTM 300 is already assigned to a channel) to accommodate the pending multimedia network access message in step 410, and when the pending multimedia network access message is not a best efforts service request in step 415 (i.e., the pending multimedia network access message is for a dynamic (reserved) service), the method proceeds to step 420. In step 420, the method determines whether there is a multimedia service, either reserved or in progress, having a comparative priority allowing movement, which may be moved to another channel (on a different, second frequency) to provide an available channel for the pending multimedia network access message (on the first or the second frequency). Step 4is utilized for two purposes. First, if a given CTM 300 is already assigned to a channel on a first frequency, additional transmissions from that CTM 300 also must be on the first frequency. If there are no currently available channels on the first frequency, the method will determine whether a current service on the first frequency may be moved to a second frequency, to accommodate the pending multimedia network access message. The service which may be moved must have a comparative priority allowing movement, and may be a service on the given CTM 300 or a service on another CTM 300. In either event, the services of a given CTM 300 will be managed jointly, such that either those services in their entirety will be moved to a new frequency, or a service of another CTM 300 will be moved to the new frequency to provide an available channel (or otherwise make room) on the current frequency for all of the services of a given CTM 300 (in their entirety). When in step 4there is a multimedia service, either reserved or in progress, having a comparative priority allowing movement, which may be moved to another channel (on a different, second frequency) to provide an available channel for the pending multimedia network access message (on the first or the second frequency), then that service is moved to the second frequency, in step 425.

It should also be noted, as discussed in greater detail below, that such movement of reserved services, or assignment of reserved services, is preferably performed with a two-part process. First, a channel is reserved for the service. Second, the service is activated on the reserved channel. This two-part process is utilized whenever a reserved service is assigned, moved, or deleted from a particular channel.

For example, a multimedia network access message requesting a voice communication session may be received from the CMS 150 for a given CTM 300 which is also currently transmitting data in an assigned channel on a given carrier frequency. As a consequence, the voice communication must be assigned to an available channel on the same carrier frequency, given a constraint that CTMs 300 have a single transmitter and may only transmit on one carrier frequency at a time. If all of the channels of the current carrier frequency happen to be in use for upstream transmissions by other CTMs 300, then in order to fulfill the current, pending multimedia network access request, either the data transmission from the given CTM 300 must be moved to another channel on a different carrier frequency which also has another available channel for the voice transmission, or a transmission from one of the other CTMs 300 must be moved to another channel on a different carrier frequency, to vacate a channel on the current carrier frequency and provide an available channel for the voice transmission.

Also for example, in the preferred embodiment, fax and TDD transmissions are not moveable to other carrier frequencies, due to the visual impairments and misspellings that would be caused by such a transfer, while data transmissions are freely moveable to other frequencies. As a consequence, if a voice session is to be provided through the same CTM 300, a channel needs to be available on the same carrier frequency. If such a channel is not currently available, the preferred methodology attempts to transfer another transmission from a different CTM 300, such as a voice or data transmission, to make an available channel on the desired carrier frequency.

Referring again to FIG. 5, when in step 420 there is no multimedia service, either reserved or in progress, which may be moved to another channel, the method proceeds to step 4to determine whether the pending multimedia network access message has a comparative priority indicating a non-blockable service, such as an emergency access request, or any other non-blocking service as determined by the service provider. When the pending multimedia network access message does not have a comparative priority indicating a non-blockable service, the method proceeds to step 470, and queues the pending multimedia network access message for subsequent fulfillment if and when a channel is available.

When the pending multimedia network access message does have a comparative priority indicating a non-blockable service, the method determines in step 435 whether there is a service, having a lower comparative priority (which is blockable), which is currently on an assigned channel, which may be disturbed or interrupted. When there is a service having a lower comparative priority (which is blockable) in step 435, the method interrupts, delays or terminates the lower priority reservation or activity, to create an available channel for the pending multimedia network access message, and queues the lower priority activity for subsequent resumption, step 440. For example, for emergency (911) access requests, in the event of insufficient HFC network 110 capacity, a data transmission, or even another voice (telephony) session, will be interrupted or disconnected in order to create an available channel for emergency use. As a consequence, in the preferred embodiment, such emergency, 911 access is non-blocking, i.e., no other type of use will block emergency access to the HFC network 110. When in step 435 there is no service having a lower comparative priority (which is blockable), the method proceeds to step 470 and queues the pending multimedia network access message for subsequent processing. This would typically occur, in the unlikely event that all channels are involved with emergency calls, or occur when all channels are involved with equal priority calls, with no lower priority transmission (such as a data or fax transmission) available to be "bumped"; in such a case, the pending request is queued for fulfillment on the next available channel.

Following step 410 (when a channel is available), step 425 (when a service is moved to another frequency), or step 440 (when another service is interrupted to accommodate the pending multimedia network access message), the method proceeds to step 445, and reserves the available channel and assigns the subsequent transmission to that channel. The CMTS 200 also stores this assignment in a database (discussed in greater detail below), to track all such channel assignments (for subsequent potential channel re-assignments, etc.), and deletes or removes the pending multimedia network access message from the receive buffer, step 450. Next, in step 455, the CMTS 200 monitors the database, and deletes any expired channel assignments (and/or channel reservations). Following steps 455, 465, and 470, the method returns to step 405, and continues to receive and process multimedia network access messages.

Not separately illustrated in FIG. 5, with regard to best efforts services, the preferred methodology may also implement a similar movement of services, or interruption of lower comparative priority best efforts services, to create channel availability for a pending multimedia network access message requesting best efforts services.

With regard to FIG. 5 above, and also with regard to FIG. 6 below, it should also be noted that these flow diagrams are intended to be illustrative of the channel management process of the present invention, and should not be construed to affect a search methodology utilized to identify available channels or services (for movement or deletion). More specifically, in the preferred embodiment, more efficient searching methodologies may be employed, such that a single search may be made of a database (transmit map and flow map, as discussed below), with the single search extracting all needed information. FIGS. 5 and 6, then, are illustrative of the various conditions which may occur, and the resulting assignments or modifications, in the channel management process.

FIG. 6 is a detailed flow diagram illustrating a preferred method embodiment for multimedia access network channel management in accordance with the present invention. As mentioned above, this channel management process executes on the CMTS 200. As illustrated in greater detail below, utilizing established comparative priorities, the methodology of the invention generally ensures that high priority telecommunication services are provided immediate access to the HFC network 110. In addition, to maximize network 110 utilization and data throughput, the preferred methodology utilizes sophisticated searching methodology to manage multiple services when the CTM 300 or CM 300A has a single transmitter and must transmit multiple services on a single frequency. The preferred methodology, when necessary, also interleaves best efforts services with reserved services, utilizing reserved channels which are not yet active for best efforts services, such as variable bit rate data transmission.

In addition to best efforts services, as mentioned above, the preferred methodology utilizes dynamic (or reserved) services, generally having a constant or minimum bit rate. Such dynamic (or reserved) services are generally utilized for any multimedia service, such as voice, fax or data, which are to be provided with some guaranteed level of access, such as a PSTN quality of service. In the preferred embodiment, authorization to use the service and reservation of a channel to use the service occur together, and a referred to herein simply as part of the reservation process. Typically, such a combined authorization and reservation is generated by the CMS 150, as a gate message, in response to a request from a CTM 300 or CM 300A.

Also as indicated above, for dynamic (reserved) services in the preferred embodiment, a channel reservation process occurs prior to and apart from a channel activation (or channel use) process. As a consequence, two lists or maps are maintained in a database in the present invention: first, a flow (or reservation) map, indicating which CTM 300 or CM 300A has reserved which channel for upstream transmission; and second, a transmit map, indicating which CTM 300 or CM 300A has activity (transmission) on which channel for upstream transmission. As a consequence, when a modification is made to the flow (reservation) map, a corresponding change is automatically made in the transmit map, such as to transfer a reserved service to another channel.

The process receives multimedia network access messages, such as best efforts service requests (BES-REQ), dynamic service addition requests (DSA-REQ), dynamic service change requests (DSC-REQ), and dynamic service deletion requests (DSD-REQ) from the various CTMs 300 and CMs 300A, and receives gate messages (such as service reservation and authorization messages) from the CMS 150.

In the preferred embodiment, the access network upstream bandwidth dynamic requests (DSA-REQ and DSC-REQ) must be preauthorized and have bandwidth reserved prior to allowing the CTMs 300 to utilize the service. Typically, such dynamic requests are used in conjunction with constant bit rate (CBR) data transmission, such as those associated with a telephone service application. The access network upstream bandwidth for best efforts services (BES-REQ) need not be dynamically authorized prior to allowing the CTMs 300 and CMs 300A to utilize the service, but may be statically authorized. Such best effort service requests are used typically in conjunction with variable bit rate (VBR) data transmission, such as electronic mail (email) and communications utilizing the World Wide Web. The BES-REQ, DSA-REQ and DSC-REQ requests contain parameters indicating the bandwidth required to send a data packet. The CTMs 300 and CMs 300A sending best effort service requests may be given a partial grant indicating that a packet fragment should be sent on the upstream. Upon receiving a partial upstream grant, the CTMs 300 or CMs 300A fragment the IP data packet, transmits a partial data packet and generates a second best effort service request for the partial packet remaining to be transmitted.

In the preferred embodiment, the gate messages serve to dynamically authorize CTMs 300 or CMs 300A access network usage and ensure availability of access network bandwidth prior to adding or modifying a service. Gate messages also serve to revoke network service authorization. Typically, such service revocation occurs in conjunction with expiration of a prepaid service, such as that associated with an expiration of calling card usage.

Referring to FIG. 6, the process begins (step 500) by initializing database structures, step 502, such as a flow map, a transmit map, an authorization list, and a poll list. The poll list contains a list of multimedia transmission devices (multimedia modems, such as CTMs 300 and CMs 300A) that are polled at a periodic interval to determine if these modems have packets to be transmitted on the upstream. (In the interests of brevity, with respect to FIG. 6, CTMs 300 and CMs 300A are individually and collectively referred to herein as CTMs 300 or simply CTMs). The authorization list contain a list of CTMs that a provided a best efforts service, and contains the comparative priorities for each of those services. The poll list and authorization list are static structures and are not dynamically modified by the channel management process.

The transmit map is used to describe VBR and CBR transmission states. The flow map is used to describe CBR flow states. The transmit map and flow map structures are dynamically modified by the channel management process. The transmit map is a two-dimensional structure used to describe upstream cell transmission assignments, and the flow map is a two-dimensional structure used to reserve upstream bandwidth. Both the flow map and the transmit map data structures are allocated as two-dimensional structures. These structures are indexed according to time and frequency, as illustrated in FIG. 2. The structure size typically represents a single frame of transmit information but it is obvious to those skilled in the art that the structures could also represent multiple frames of transmit information.

Attributes associated with the poll list include a CTM identifier, a CTM flow (or service) identifier used to identify the service, a value indicating the poll interval, and a value indicating the elapsed period since the last poll. The channel management process uses the poll list to indicate when a CTM should be polled for data transmission. Polling is accomplished by generating periodic transmission grants to the CTM without the CTM having first generated a request.

Attributes associated with the transmit map structure include a status indicator used to indicate if the cell has been allocated or is unused, a type of service indicator used to indicate the type of service provided, a CTM identifier used to uniquely identify the CTM that is assigned to this service, a CTM flow identifier used to identify the service, an authorized service priority level used to indicate special treatment for this service, and the IP address(es) and port number(s) associated with this service. The transmit map may include other attributes for managing services that use partially full cells or sub-cells.

Attributes associated with the flow map structure include a status indicator used to indicate if the flow is reserved, active, or unused; a type of service indicator used to indicate the type of service provided; a CTM identifier used to uniquely identify the CTM that is assigned to this cell; a CTM flow identifier used to identify the service; the reserved service priority used to indicate the highest authorized priority of a flow; the active service priority used to indicate special treatment of these flows; the IP address(es) and port number(s) associated with this service; and a reservation life span indicator used to ensure that the flow reservations expire if they are not activated. The flow map may include other attributes as well, such as an offset within the cell and a length to aid in managing partially full cells or sub-cells.

In step 502, the transmit data (or database) structure is initialized to indicate that all cells are unused and free to be used when requested. The flow map is initialized to indicate that all cells are unused. However, some systems may require that the system always reserve a minimum bandwidth for data services and other system control information. This may be accomplished by initializing the flow map status attribute to indicate active, the type of service attribute to indicate system data, and other attributes to indicate wild card identifiers. Some systems may require this minimum system type of service to be available on each upstream frequency. This may be accomplished by initializing a cell at each frequency for a system service. Additionally, to allow system operators control of the system while in operation, the system data type of service flow map values may be changed from a provisioning server using a protocol such as the simple network management protocol (SNMP). In step 502, the poll list is initialized such that no CTMs are polled, and the poll list may be modified from a provisioning server using a protocol such as SNMP. Additionally, the poll list and authorization list may be modified using a gate message.

After initializing data structures (step 502), the channel management process enters a loop waiting for messages in an input receive (Rx) buffer (step 504), transmit map requests (step 506) or gate messages (step 508). Messages received in the Rx buffer (such as memory 220) are channel access requests sent from CTMs across the access network 110. Gate messages are messages received from the CMS 150 in response to call control messages. Transmit map request messages are generated locally to the CMTS 200 at periodic intervals. The transmit map request periodic interval is typically a multiple of the frame rate.

When the channel management process detects a message in the input buffer (step 504), it should determine the message type. This is accomplished by checking the message to determine if it is a DSD-REQ (dynamic service delete request), step 510, a BES-REQ (a best effort service request), step 512, a DSC-REQ (dynamic service change request), step 514, or a DSA-REQ (dynamic service addition request), step 516.

When the channel management process detects a DSD-REQ message (step 510), the flow identified by the DSD-REQ message is deleted from the transmit map and the flow map (step 511). This is accomplished by setting the status attribute associated with the flow identified by the DSD-REQ to unused.

When the channel management process detects a data service request or BES-REQ (step 512), the flow map is checked to determine the authorized priority level of the request. If the requested priority level is higher than the authorized priority level, the request priority is changed to that indicated by the flow map. This process validates the BES-REQ. When the channel management process detects a valid BES-REQ (step 512), the transmit map is checked to see if the CTM associated with the BES-REQ has active cells in the transmit map (step 518). If the CTM associated with the BES-REQ does not have active cells in the transmit map, the transmit map is searched to determine which frequency has the most unused cells and if sufficient unused time (and continuous or adjacent) cells at this frequency are available for the requested data service (step 520). If sufficient time-continuous unused cells at a single frequency are found to provide the requested service, one or more of the unused transmit map cells are marked to actively provide the requested service (step 522). If insufficient time-continuous unused cells at a single frequency are found to provide the requested service, the transmit map is searched to determine if one or more CTMs with lower priority active data service (s) can be deleted from the transmit map (e.g. status change to unused) to provide increased bandwidth for the requested service (step 524). If one or more CTMs with lower priority active data service can be deleted from the transmit map to provide increased bandwidth for the requested service, the service(s) are deleted in whole or part from the transmit map (step 526), and if deleted in whole, added to the next frame queue (526). The deleted service cells are then marked to actively provide the requested service (step 528). Optionally (not illustrated in FIG. 6), prior to deleting the lower priority service(s) (step 526), the transmit map may be searched to determine if the deleted service(s) can be changed to a different position in the transmit map in whole or part. If the service(s) to be deleted can be changed to a different position in the transmit map, the service(s) are activated in whole or part at the new position. If one or more CTMs with lower priority active data service cannot be deleted from the transmit map to provide increased bandwidth for the requested service, the service associated with the BES-REQ is added to the next frame queue or a partial service is activated (step 530).

When the channel management process detects a valid BES-REQ (step 512), and the CTM associated with the BES-REQ has active cells in the transmit map (step 518), the transmit map is searched to determine if sufficient unused bandwidth at the same frequency as the active service exists to provide the requested service (step 532). If sufficient time-continuous (adjacent) unused cells are found at the same frequency as the active service, one or more of the unused cells are marked to actively provide the requested service (step 534). When the channel management process detects a valid BES-REQ (step 512), the CTM associated with the BES-REQ has active cells in the transmit map (step 518), but there is insufficient unused bandwidth at the same frequency as the active service to provide the requested service (step 532), the transmit map is searched to determine if one or more CTMs with only a lower priority active data service can be found at the frequency associated with requesting CTM active cells (step 536). If a CTM with lower priority active data service cannot be found, the service associated with the BES-REQ is added to the next frame queue or a partial service is activated (step 538). When one or more CTMs with lower priority active data service can be found at the frequency associated with the requesting CTM active cells (step 536), the transmit map is searched to determine if one or more CTMs with lower priority active data service can be changed in whole or part to other time-continuous cells at a single frequency, thus providing increased bandwidth for the requested service at the frequency associated with the requesting CTM active cells (step 540). If a CTM with lower priority active data service can be changed in whole or part to other time-continuous cells at a single frequency, the lower priority active data service is deleted, the service is activated in whole or part at the new transmit map position (step 542), and the requested service is activated at the frequency associated with the requesting CTM active cells (step 544).

When in step 540 one or more CTMs with lower priority active data service cannot be changed to other cell positions to provide increased bandwidth for the requested service, the transmit map is searched to determine if one or more CTMs with lower priority active data service can be deleted in whole or part to provide increased bandwidth for the requested service at the frequency associated with requesting CTM active cells (step 546). If a CTM with lower priority active data service can be deleted in whole or part to provide increased bandwidth for the requested service, the service(s) are deleted in whole or part from the transmit map and, if deleted in whole, added to the next frame queue (step 548). The deleted service cells are then marked to actively provide the requested service (550). When one or more CTMs with lower priority active data service cannot be deleted in whole or part to provide increased bandwidth for the requested service at the frequency associated with requesting CTM active cells (step 546), the service associated with the BES-REQ is added to the next frame queue or a partial service is activated (step 552).

When the channel management process detects a DSC-REQ message, the transmit map is searched for active cells associated with the flow indicated by the DCS-REQ (step 514). If active cells for the indicated flow are detected in the transmit map, the respective transmit map cell status is changed to unused and the associated flow map cell status is changed to reserved (step 554). The channel management process then treats the DSC-REQ as a DSA-REQ.

When the channel management process detects a DSA-REQ message (step 516), the flow map is searched to determine if the flow associated with the DSA-REQ has been reserved (step 556). If the flow has not been reserved or the request indicates a larger bandwidth or higher priority level than that indicated by the flow map, the transmit map and flow map are not modified. When the channel management process detects a DSA-REQ message (step 516) and the flow map indicates the flow associated with the DSA-REQ has been reserved (step 556), the transmit map is searched to determine if a data service is active at the cell position associated with reservation (step 558). If a data service is not active at the cell position associated with reservation in step 558, the transmit map and flow map cells for the service associated with the DSA-REQ are activated (step 564). When a data service is active at the cell position associated with reservation (step 558), the transmit map is searched to determine if the active service(s) can be changed in whole or part to other time-continuous cells at a single frequency (step 560). If the active service(s) can be changed in whole or part to other time-continuous cells at a single frequency, then the active service(s) is changed to a new cell position(s) (step 562). If the active service(s) cannot be changed in whole or part to other time continuous cells at a single frequency in step 560, then the active service(s) is deleted in whole or part and if deleted in whole, added to the next frame queue (step 566). Having either moved the active service to another cell position or deleted the service, the transmit map and flow map cells for the service associated with the DSA-REQ are activated (step 564).

After the transmit map and flow map cells for the service associated with the DSA-REQ are activated in step 564, the transmit map is searched to determine if the CTM associated with the DSA-REQ has an active data service at a frequency other than the reserved frequency (step 568). If the CTM associated with the DSA-REQ does not have an active data service at a frequency other than the reserved frequency in step 568, the channel management process has completed servicing the DSA-REQ. If the CTM associated with the DSA-REQ has an active data service at frequency other than the reserved frequency in step 568, the transmit map is searched to determine if the active data service can be moved in whole or part to the frequency associated with the service indicated by the DSA-REQ (step 570). If the data service can be moved to the frequency associated with the service indicated by the DSA-REQ, the active data service is deleted and the data service is activated in whole or part at the new transmit map position (step 576). If the data service can not be moved to the frequency associated with the service indicated by the DSA-REQ, the data service is deleted in whole or part from the transmit map (step 572), and if deleted in whole, added to the next frame queue (step 574).

Referring again to the post-initialization loop (steps 504, 506 and 508), when the channel management process detects a transmit MAP message request (step 506), the channel management process should transmit a MAP message on the downstream (step 580). This MAP message is specified in various standards such as DOCSIS, and is used to grant the CTMs transmission access on the upstream. After detecting a map transmit request, the transmit buffer is searched for active cells (step 506). When an active cell is found, a MAP message (identifying the CTM that may transmit, the transmit start time, transmission duration and transmission frequency) is broadcast to all CTMs (step 580). After the channel management process has transmitted a MAP message on the downstream (step 580), the process changes the transmit map active status indicator to unused (step 582). At this point, the channel map process examines the flow buffer and determines if the flows having an indicated reservation status should be expired (step 584). This is accomplished by examining the flow map cells having a reserved status. When cells with reserved status are detected, the life span indicator parameter is decremented and when this parameter reaches zero, all cells associated with the flow are marked unused. After expiring unused reservations (step 584), the channel management process searches the flow map for active flows and when a active cell is detected in the flow map, a cell in the transmit map at the same time and frequency is activated (step 586).

Additionally, when the channel process detects a map transmit request (step 506), the polled service list is checked (step 588), and if the list indicates a CTM is to be polled, the polled service is activated in the transmit map. If the CTM has an active service, the polled service is activated on the same frequency as the active service, or the active service may be moved to another frequency. It may be necessary to delete or move other services to create capacity for the polled service on the:active service frequency. The comparative priority of the service is used to determine if the active service is moved, or if other services are moved or deleted. It should be noted that the polled list may contain information that indicates the poll rate as a function of the transmit map request rate. This may be handled using an attribute of the polled list elements that is decremented and when reaching zero causes the service to be activated and the counter reset to its initial value. After having activated the polled service (step 588), the channel management process services the next frame queue, by simply forwarding a service request to the Rx input buffer for each queued service (step 590). To prevent infinite looping of service requests each time a queued service is moved to the Rx input buffer, a loop count is incremented, and if the loop count exceeds a predetermined maximum, the service request is dropped.

Referring again to the post-initialization loop (steps 504, 506 and 508), when the channel management process detects a gate message (step 508), the process determines if the gate message is a reservation deletion request (step 600). If the request is a deletion in step 600, the service associated with this request is deleted from the flow map and the transmit map (step 601). This is accomplished by setting the status of cells associated with this service to unused. When the gate message is not a reservation deletion request (step 600), and the gate message is not an addition request (step 602), the flow map and transmit map are unaffected. If, however, the gate message is an addition request (step 602), the process attempts to add a reservation associated with service to the flow map, proceeding to step 603.

The process of adding a reservation to the flow map begins by determining if the CTM associated with the addition request has either active or reserved cells within the flow map (step 603). If flow map contains no active or reserved cells for the CTM indicated by the addition request, the flow map is searched to determine the frequency with the maximum number of time-continuous unused cells (step 604). If sufficient time-continuous cells at a single frequency are available to provide the service, the service is reserved (step 605). This is accomplished by modifying the respective flow map cells status and attributes.

When insufficient time-continuous cells at a single frequency are available to provide the service (step 604), the flow map is searched for a lower priority reserved service that, if deleted, would provide sufficient bandwidth to satisfy the requested service reservation (step 606). If such a lower priority service is found, the lower priority service is deleted from the flow map (step 607) and the requested service is reserved (step 608). If such a lower priority service cannot be found in step 606, the flow map is searched for an active service that, if deleted, would provide sufficient bandwidth to satisfy the requested service reservation (step 609). If such a lower priority active service is found in step 609, the lower priority service is deleted from the flow map (step 610), and the requested service reservation is reserved (step 611). If after having checked the flow map for lower priority reserved (step 606) and active services to delete (step 609), the requested service still cannot be accommodated (step 609), no changes are made to the transmit or flow map.

When the process detects a gate message (step 508), the gate message is not a reservation deletion request (step 600), the gate message is a reservation addition request (step 602), and the CTM associated with the reservation addition request is present in the flow map (step 603), the flow map is checked for unused cells at the frequency associated with this CTM (step 612). If sufficient bandwidth is found at this frequency to provide the requested service, the service is reserved at the indicated frequency (step 613). When insufficient bandwidth is found at this frequency to provide the requested service in step 612), the flow map is checked to determine if sufficient bandwidth is available at other frequencies to provide all CTM services (step 614). If sufficient bandwidth is available at other frequencies, all CTM services are moved to the new frequency (step 615) and the requested service is reserved on the new frequency (step 616).

When insufficient bandwidth is available at this frequency to provide all CTM services (step 612), and insufficient bandwidth is available at other frequencies to provide all CTM services (step 614), the flow map is checked to determine if other CTMs services can change cell positions such that the requested service can be reserved at the frequency indicated by the active service associated with the CTM (step 617). If sufficient bandwidth is available such that other CTMs services can change cell positions, so the requested service can be reserved at the frequency indicated by the active service associated with the CTM, the other CTMs' flows are moved to a new transmit map position (step 618), and the requested service is reserved at the frequency associated with the active CTM service (step 619). When considering changing frequencies of a service indicated in the flow map, it is preferable to first consider moving reserved service before considering moving active services. Some systems, however, may not desire a frequency change for an active service, and may optionally consider only reserved services for frequency change candidates.

When frequency changing CTM services provides insufficient bandwidth for the requested service (step 614 and step 617), the flow map is searched for reserved services with lower priority that the requested service (step 620). If lower priority reserved services are found and can be deleted to allow the requested service to be reserved, then the lower priority reserved service is removed from the flow map (step 621) and the requested service is reserved (step 622). If deleting lower priority reserved services does not provide sufficient bandwidth to allow reserving the requested service (step 620), active services within the flow map are considered for deletion (step 623). If lower priority active services are found that, when deleted, allow the requested service to be reserved (step 623), then the lower priority active service is removed from the flow map (step 624) and the requested service is reserved (step 625).

Numerous advantages of the present invention may be apparent from the discussion above. The channel management process of the present invention provides a non-blocking emergency (911) access service, when the gate message indicates a high priority flow should be reserved. This is accomplished when the CMS 150 detects that an emergency number has been dialed and sends a gate message to the CMTS 200 indicating a high priority flow is to be reserved. In fact, the CMS 150 may indicate the emergency service flow priority as the highest priority flow.

The channel management process also provides a minimum number of frequency changes to flows associated with FAX and TDD traffic. This is accomplished when the CTM 150 detects a FAX or TDD signaling, and in response, issues a DSC-REQ to set the associated flow priority higher than the non-911 voice traffic flows. The ability for the CTM 150 to change priorities is supported in the CMTS 200 by allowing the priority indicated in the DCS-REQ to be lower than the authorized priority contained in the reservation addition message.

The channel management process provides a low blocking telephone service (CBR service) by assigning these services a higher priority than data services. This process allows efficient usage of upstream bandwidth by providing active data service on bandwidth reserved for CBR but not yet activated and in use.

Additionally, the channel management process provides multiple levels of best efforts services by utilizing an authorization parameter that includes an indication of the service priority level, and provides guaranteed minimum levels of service through the usage of a real-time poll list. The channel management process also provides a mechanism that allows a combination of access methods for a single service, such as providing a polled service in combination with a best efforts service or a dynamic service. The various embodiments are also not limited to any particular protocol such as for DOCSIS cable systems, and may be extended to protocols for any network or system (such as RSVP).

The apparatus, method and system embodiments of the present invention provide for access network management, providing a level or quality of service comparable to the PSTN, while simultaneously providing broadband multimedia transmission capability. The various embodiments provide for a minimal potential blocking of emergency calls and voice calls, and provide for optimal data transmission, including optimal fax and TDD quality. The apparatus, method and system of the present invention are user friendly, user transparent, and capable of implementation within existing hybrid fiber/coax networks.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A method for multimedia access network channel management, the multimedia access network having a plurality of channels, each channel of the plurality of channels consisting of a time division multiple access time slot of a plurality of time division multiple access time slots and a carrier frequency of a plurality of carrier frequencies, the method comprising:

(a) receiving a first multimedia network access message having a comparative priority;

(b) when there is a first channel which is available from the plurality of channels, assigning a first transmission corresponding to the first multimedia network access message to the first channel;

(c) when there is no first channel which is available from the plurality of channels, and when there is a second transmission on a second channel of the plurality of channels which is moveable to a third channel of the plurality of channels, reassigning the second transmission to the third channel and assigning the first transmission corresponding to the first multimedia network access message to the second channel; and (d) when there is no first channel which is available from the plurality of channels, when there is no second transmission on a second channel which is moveable to a third channel, and when there is a third transmission on a fourth channel, of the plurality of channels, having a lower comparative priority than the comparative priority of the first multimedia network access message, removing the third transmission from the fourth channel, and assigning the transmission corresponding to the first multimedia network access message to the fourth channel.

2. The method of claim 1, further comprising:

when there is no first channel which is available from the plurality of channels, when there is no second transmission on a second channel which is moveable to a third channel, and when there is no third transmission on the fourth channel having the lower comparative priority than the comparative priority of the first multimedia network access message, queuing the first multimedia network access message for subsequent processing.

3. The method of claim 1, further comprising:

maintaining a database, the database including an identification of each transmitting device of a plurality of transmitting,devices, and the database further including, for each such transmitting device, an identification of a corresponding assigned channel of the plurality of channels.

4. The method of claim 3, wherein step (c) further comprises:

searching the database to determine whether there is the second transmission on the second channel which is moveable to the third channel.

5. The method of claim 3, wherein step (d) further comprises:

searching the database to determine whether there is the third transmission on the fourth channel having a lower comparative priority than the comparative priority of the first multimedia network access message.

6. The method of claim 1, wherein step (d) further comprises:

delaying the third transmission, and following completion of the transmission corresponding to the first multimedia network access message, resuming the third transmission on an assigned channel of the plurality of channels.

7. The method of claim 1, further comprising:

reserving a fifth channel of the plurality of channels for a constant bit rate transmission;

prior to the commencement of the constant bit rate transmission, utilizing the fifth channel for a variable bit rate transmission.

8. The method of claim 1, further comprising:

receiving a second multimedia network access message for a comparatively high bandwidth transmission;

determining a second plurality of channels consisting of a plurality of time-continuous channels having the comparatively high bandwidth, the second plurality of channels being a subset of the plurality of channels;

moving a plurality of transmissions, the plurality of transmissions assigned to respective channels of the second plurality of channels, to other channels of the plurality of channels which are not time-continuous; and assigning a transmission corresponding to the second multimedia network access message to the second plurality of channels.

9. The method of claim 1, further comprising:

receiving a second multimedia network access message from a transmitting device, the transmitting device having a current transmission on a current assigned channel, of the plurality of channels, on a first carrier frequency of the plurality of carrier frequencies;

when a first vacant channel, of the plurality of channels, is available on the first carrier frequency for the second multimedia network access message, assigning a transmission corresponding to the second multimedia network access message to the first vacant channel;

when the first vacant channel is not available on the first carrier frequency, when a second plurality of channels for the second multimedia network access message and for the current transmission are available on a second carrier frequency of the plurality of carrier frequencies, the second plurality of channels being a subset of the plurality of channels, and when the current transmission is moveable, moving the current transmission and assigning the transmission corresponding to the second multimedia network access message to the second plurality of channels on the second carrier frequency.

10. The method of claim 9, further comprising:

when the first vacant channel is not available on the first carrier frequency, when the current transmission is not moveable, when a reserved channel of the plurality of channels is available on the first carrier frequency, and when a second vacant channel of the plurality of channels is available on the second carrier frequency, moving a reservation corresponding to the reserved channel to the second vacant channel on the second carrier frequency and assigning the transmission corresponding to the second multimedia network access message to the reserved channel on the first carrier frequency.

11. The method of claim 10, further comprising:

when the first vacant channel is not available on the first carrier frequency, when the current transmission is not moveable, when no reserved channel is available on the first carrier frequency, and when a second vacant channel of the plurality of channels is available on a second carrier frequency, moving a second current transmission from the first carrier frequency to the second vacant channel on the second carrier frequency to form a currently available channel on the first carrier frequency, and assigning the transmission corresponding to the second multimedia network access message to the currently available channel on the first carrier frequency.

12. The method of claim 1, wherein the comparative priority and the lower comparative priority are determined from a plurality of comparative priorities, and wherein the plurality of comparative priorities include a first priority corresponding to emergency access services, a second priority comparatively lower than the first priority, the second priority corresponding to voice transmission or to video transmission, a third priority comparatively lower than the second priority, the third priority corresponding to facsimile transmission or TDD transmission, and a fourth priority comparatively lower than the third priority, the fourth priority corresponding to data transmission.

13. The method of claim 1, wherein step (c) further comprises:

when the second transmission is a type of transmission from a first plurality of types of transmissions, the first plurality of types of transmissions including a facsimile transmission and a TDD transmission, determining that the second transmission is not moveable to the third channel.

14. The method of claim 1, wherein step (c) further comprises:

when the second transmission is a type of transmission from a second plurality of types of transmissions, the second plurality of types of transmissions including a voice transmission, a data transmission, and a video transmission, determining that the second transmission is moveable to the third channel.

15. The method of claim 1, wherein the first multimedia network access message is from a plurality of multimedia network access messages, the plurality of multimedia network access messages including a best efforts service request, a gate message, a dynamic service addition request, a dynamic service change request, and a service reservation message.

16. The method of claim 1, wherein step (b) further comprises:

reserving the first channel for the first transmission corresponding to the first multimedia network access message prior to activating the first transmission corresponding to the first multimedia network access message on the first channel.

17. The method of claim 1, wherein step (c) further comprises:

reserving the third channel for the second transmission prior to activating the second transmission on the third channel; and reserving the second channel for the first transmission corresponding to the first multimedia network access message prior to activating the first transmission corresponding to the first multimedia network access message on the second channel.

18. The method of claim 1, wherein step (d) further comprises:

deleting a reservation of the fourth channel for the third transmission; and reserving the fourth channel for the first transmission corresponding to the first multimedia network access message prior to activating the first transmission corresponding to the first multimedia network access message on the fourth channel.

19. An apparatus for multimedia access network channel management, the multimedia access network having a plurality of channels, each channel of the plurality of channels consisting of a time division multiple access time slot of a plurality of time division multiple access time slots and a carrier frequency of a plurality of carrier frequencies, the apparatus comprising:

a network interface for receiving a first multimedia network access message having a comparative priority;

a memory; and a processor coupled to the network interface and to the memory, wherein the processor, when operative, is configured, when there is a first channel which is available from the plurality of channels, to assign a first transmission corresponding to the first multimedia network access message to the first channel; the processor further configured, when there is no first channel which is available from the plurality of channels, and when there is a second transmission on a second channel of the plurality of channels which is moveable to a third channel of the plurality of channels, to reassign the second transmission to the third channel and to assign the first transmission corresponding to the first multimedia network access message to the second channel; and the processor further configured, when there is no first channel which is available from the plurality of channels, when there is no second transmission on the second channel which is moveable to the third channel, and when there is a third transmission on a fourth channel of the plurality of channels having a lower comparative priority than the comparative priority of the first multimedia network access message, to remove the third transmission from the fourth channel and to assign the transmission corresponding to the first multimedia network access message to the fourth channel.

20. The apparatus of claim 19, wherein the processor is further configured, when there is no first channel which is available from the plurality of channels, when there is no second transmission on a second channel which is moveable to a third channel, and when there is no third transmission on the fourth channel having the lower comparative priority than the comparative priority of the first multimedia network access message, to queue the first multimedia network access message for subsequent processing.

21. The apparatus of claim 19, wherein the processor is further configured to maintain a database stored in the memory, the database including an identification of each transmitting device of a plurality of transmitting devices, and the database further including, for each such transmitting device, an identification of a corresponding assigned channel of the plurality of channels.

22. The apparatus of claim 21, wherein the processor is further configured to search the database to determine whether there is the second transmission on the second channel which is moveable to the third channel.

23. The apparatus of claim 21, wherein the processor is further configured to search the database to determine whether there is the third transmission on the fourth channel having a lower comparative priority than the comparative priority of the first multimedia network access message.

24. The apparatus of claim 19, wherein the processor is further configured to delay the third transmission, and following completion of the transmission corresponding to the first multimedia network access message, to allow resumption of the third transmission on an assigned channel of the plurality of channels.

25. The apparatus of claim 19, wherein the processor is further configured to reserve a fifth channel of the plurality of channels for a constant bit rate transmission, and prior to the commencement of the constant bit rate transmission, to allow utilization of the fifth channel for a variable bit rate transmission.

26. The apparatus of claim 19, wherein the network interface receives a second multimedia network access message for a comparatively high bandwidth transmission; and wherein the processor is further configured to determine a second plurality of channels consisting of a plurality of time-continuous channels having the comparatively high bandwidth, the second plurality of channels being a subset of the plurality of channels; the processor further configured to reassign a plurality of transmissions, the plurality of transmissions previously assigned to respective channels of the second plurality of channels, to other channels of the plurality of channels which are not time-continuous; and wherein the processor is further configured to assign a transmission corresponding to the second multimedia network access message to the second plurality of channels.

27. The apparatus of claim 19, wherein the network interface receives a second multimedia network access message from a transmitting device, the transmitting device having a current transmission on a current assigned channel, of the plurality of channels, on a first carrier frequency of the plurality of carrier frequencies; and wherein the processor is further configured, when a first vacant channel, of the plurality of channels, is available on the first carrier frequency for the second multimedia network access message, to assign a transmission corresponding to the second multimedia network access message to the first vacant channel; the processor further configured, when the first vacant channel is not available on the first carrier frequency, when a second plurality of channels for the second multimedia network access message and for the current transmission are available on a second carrier frequency of the plurality of carrier frequencies, the second plurality of channels being a subset of the plurality of channels, and when the current transmission is moveable, to reassign the current transmission and assign the transmission corresponding to the second multimedia network access message to the second plurality of channels on the second carrier frequency.

28. The apparatus of claim 27, wherein the processor is further configured, when the first vacant channel is not available on the first carrier frequency, when the current transmission is not moveable, when a reserved channel of the plurality of channels is available on the first carrier frequency, and when a second vacant channel of the plurality of channels is available on the second carrier frequency, to reassign a reservation corresponding to the reserved channel to the second vacant channel on the second carrier frequency and assign the transmission corresponding to the second multimedia network access message to the reserved channel on the first carrier frequency.

29. The apparatus of claim 28, wherein the processor is further configured, when the first vacant channel is not available on the first carrier frequency, when the current transmission is not moveable, when no reserved channel is available on the first carrier frequency, and when a second vacant channel of the plurality of channels is available on a second carrier frequency, to reassign a second current transmission from the first carrier frequency to the second vacant channel on the second carrier frequency to form a currently available channel on the first carrier frequency, and to assign the transmission corresponding to the second multimedia network access message to the currently available channel on the first carrier frequency.

30. The apparatus of claim 19, wherein the processor is further configured to determine the comparative priority and the lower comparative priority from a plurality of comparative priorities, and wherein the plurality of comparative priorities include a first priority corresponding to emergency access services, a second priority comparatively lower than the first priority, the second priority corresponding to voice transmission or to video transmission, a third priority comparatively lower than the second priority, the third priority corresponding to facsimile transmission or TDD transmission, and a fourth priority comparatively lower than the third priority, the fourth priority corresponding to data transmission.

31. The apparatus of claim 19, wherein the processor is further configured, when the second transmission is a type of transmission from a first plurality of types of transmissions, the first plurality of types of transmissions including a facsimile transmission and a TDD transmission, to determine that the second transmission is not moveable to the third channel.

32. The apparatus of claim 19, wherein the processor is further configured, when the second transmission is a type of transmission from a second plurality of types of transmissions, the second plurality of types of transmissions including a voice transmission, a data transmission, and a video transmission, to determine that the second transmission is moveable to the third channel.

33. The apparatus of claim 19, wherein the first multimedia network access message is from a plurality of multimedia network access messages, the plurality of multimedia network access messages including a best efforts service request, a gate message, a dynamic service addition request, a dynamic service change request, and a service reservation message.

34. The apparatus of claim 19, wherein the processor is further configured to reserve the first channel for the first transmission corresponding to the first multimedia network access message prior to activating the first transmission corresponding to the first multimedia network access message on the first channel.

35. The apparatus of claim 19, wherein the processor is further configured to reserve the third channel for the second transmission prior to activating the second transmission on the third channel; and wherein the processor is further configured to reserve the second channel for the first transmission corresponding to the first multimedia network access message prior to activating the first transmission corresponding to the first multimedia network access message on the second channel.

36. The apparatus of claim 19, wherein the processor is further configured to delete a reservation of the fourth channel for the third transmission, and to reserve the fourth channel for the first transmission corresponding to the first multimedia network access message prior to activating the first transmission corresponding to the first multimedia network access message on the fourth channel.

37. A system for multimedia access network channel management, the multimedia access network having a plurality of channels, each channel of the plurality of channels consisting of a time division multiple access time slot of a plurality of time division multiple access time slots and a carrier frequency of a plurality of carrier frequencies, the system comprising:

a plurality of multimedia transmission devices for transmitting a plurality of multimedia network access messages, a first multimedia transmission device of the plurality of multimedia transmission devices having transmitted a first multimedia network access message of the plurality of multimedia network access messages, the first multimedia network access message having a comparative priority; and a multimedia termination system couplable to the plurality of multimedia transmission devices, wherein the multimedia termination system, when operative, is configured, when there is a first channel which is available from the plurality of channels, to assign a first transmission corresponding to the first multimedia network access message to the first channel; the multimedia termination system further configured, when there is no first channel which is available from the plurality of channels, and when there is a second transmission on a second channel of the plurality of channels which is moveable to a third channel of the plurality of channels, to reassign the second transmission to the third channel and to assign the first transmission corresponding to the first multimedia network access message to the second channel; and the multimedia termination system further configured, when there is no first channel which is available from the plurality of channels, when there is no second transmission on the second channel which is moveable to the third channel, and when there is a third transmission on a fourth channel of the plurality of channels having a lower comparative priority than the comparative priority of the first multimedia network access message, to remove the third transmission from the fourth channel and to assign the transmission corresponding to the first multimedia network access message to the fourth channel.

38. The system of claim 37, wherein the multimedia termination system is further configured, when there is no first channel which is available from the plurality of channels, when there is no second transmission on a second channel which is moveable to a third channel, and when there is no third transmission on the fourth channel having the lower comparative priority than the comparative priority of the first multimedia network access message, to queue the first multimedia network access message for subsequent processing.

39. The system of claim 37, wherein the multimedia termination system is further configured to maintain a database stored in the memory, the database including an identification of each transmitting device of a plurality of transmitting devices, and the database further including, for each such transmitting device, an identification of a corresponding assigned channel of the plurality of channels.

40. The system of claim 37, wherein the multimedia termination system is further configured to search the database to determine whether there is the second transmission on the second channel which is moveable to the third channel.

41. The system of claim 37, wherein the multimedia termination system is further configured to search the database to determine whether there is the third transmission on the fourth channel having a lower comparative priority than the comparative priority of the first multimedia network access message.

42. The system of claim 37, wherein the multimedia termination system is further configured to delay the third transmission, and following completion of the transmission corresponding to the first multimedia network access message, to allow resumption of the third transmission on an assigned channel of the plurality of channels.

43. The system of claim 37, wherein the multimedia termination system is further configured to reserve a fifth channel of the plurality of channels for a constant bit rate transmission, and prior to the commencement of the constant bit rate transmission, to allow utilization of the fifth channel for a variable bit rate transmission.

44. The system of claim 37, wherein a second multimedia transmission device of the plurality of telephony transmits a second multimedia network access message for a comparatively high bandwidth transmission; and wherein the multimedia termination system is further configured to determine a second plurality of channels consisting of a plurality of time-continuous channels having the comparatively high bandwidth, the second plurality of channels being a subset of the plurality of channels; the multimedia termination system further configured to reassign a plurality of transmissions, the plurality of transmissions previously assigned to respective channels of the second plurality of channels, to other channels of the plurality of channels which are not time-continuous; and wherein the multimedia termination system is further configured to assign a transmission corresponding to the second multimedia network access message to the second plurality of channels.

45. The system of claim 37, wherein a second multimedia transmission device of the plurality of multimedia transmission devices transmits a second multimedia network access message, the second multimedia transmission device having a current transmission on a current assigned channel, of the plurality of channels, on a first carrier frequency of the plurality of carrier frequencies; and wherein the multimedia termination system is further configured, when a first vacant channel, of the plurality of channels, is available on the first carrier frequency for the second multimedia network access message, to assign a transmission corresponding to the second multimedia network access message to the first vacant channel; the multimedia termination system further configured, when the first vacant channel is not available on the first carrier frequency, when a second plurality of channels for the second multimedia network access message and for the current transmission are available on a second carrier frequency of the plurality of carrier frequencies, the second plurality of channels being a subset of the plurality of channels, and when the current transmission is moveable, to reassign the current transmission and assign the transmission corresponding to the second multimedia network access message to the second plurality of channels on the second carrier frequency.

46. The system of claim 45, wherein the multimedia termination system is further configured, when the first vacant channel is not available on the first carrier frequency, when the current transmission is not moveable, when a reserved channel of the plurality of channels is available on the first carrier frequency, and when a second vacant channel of the plurality of channels is available on the second carrier frequency, to reassign a reservation corresponding to the reserved channel to the second vacant channel on the second carrier frequency and assign the transmission corresponding to the second multimedia network access message to the reserved channel on the first carrier frequency.

47. The system of claim 46, wherein the multimedia termination system is further configured, when the first vacant channel is not available on the first carrier frequency, when the current transmission is not moveable, when no reserved channel is available on the first carrier frequency, and when a second vacant channel of the plurality of channels is available on a second carrier frequency, to reassign a second current transmission from the first carrier frequency to the second vacant channel on the second carrier frequency to form a currently available channel on the first carrier frequency, and to assign the transmission corresponding to the second multimedia network access message to the currently available channel on the first carrier frequency.

48. The system of claim 37, wherein the multimedia termination system is further configured to determine the comparative priority and the lower comparative priority from a plurality of comparative priorities, and wherein the plurality of comparative priorities include a first priority corresponding to emergency access services, a second priority comparatively lower than the first priority, the second priority corresponding to voice transmission or to video transmission, a third priority comparatively lower than the second priority, the third priority corresponding to facsimile transmission or TDD transmission, and a fourth priority comparatively lower than the third priority, the fourth priority corresponding to data transmission.

49. The system of claim 37, wherein the multimedia termination system is further configured, when the second transmission is a type of transmission from a first plurality of types of transmissions, the first plurality of types of transmissions including a facsimile transmission and a TDD transmission, to determine that the second transmission is not moveable to the third channel.

50. The system of claim 37, wherein the multimedia termination system is further configured, when the second transmission is a type of transmission from a second plurality of types of transmissions, the second plurality of types of transmissions including a voice transmission, a data transmission, and a video transmission, to determine that the second transmission is moveable to the third channel.

51. The system of claim 37, wherein the multimedia termination system is further configured to reserve the first channel for the first transmission corresponding to the first multimedia network access message prior to activating the first transmission corresponding to the first multimedia network access message on the first channel.

52. The system of claim 37, wherein the multimedia termination system is further configured to reserve the third channel for the second transmission prior to activating the second transmission on the third channel; and wherein the processor is further configured to reserve the second channel for the first transmission corresponding to the first multimedia network access message prior to activating the first transmission corresponding to the first multimedia network access message on the second channel.

53. The system of claim 37, wherein the multimedia termination system is further configured to delete a reservation of the fourth channel for the third transmission, and to reserve the fourth channel for the first transmission corresponding to the first multimedia network access message prior to activating the first transmission corresponding to the first multimedia network access message on the fourth channel.

54. An apparatus for multimedia access network channel management, the multimedia access network having a plurality of channels, each channel of the plurality of channels consisting of a time division multiple access time slot of a plurality of time division multiple access time slots and a carrier frequency of a plurality of carrier frequencies, the apparatus comprising:

a network interface for receiving a first multimedia network access message for a best efforts service, the first multimedia network access message having a comparative priority;

a memory; and a processor coupled to the network interface and to the memory, wherein the processor, when operative, is configured, when there is a first channel which is available from the plurality of channels, to assign a first best efforts transmission corresponding to the first multimedia network access message to the first channel; the processor further configured, when there is no first channel which is available from the plurality of channels, and when there is a second best efforts service transmission on a second channel of the plurality of channels which is moveable to a third channel of the plurality of channels, to reassign the second best efforts service transmission to the third channel and to assign the first best efforts transmission corresponding to the first multimedia network access message to the second channel; and the processor further configured, when there is no first channel which is available from the plurality of channels, when there is no second best efforts transmission on the second channel which is moveable to the third channel, when there is a reserved channel which is not active, to assign the first best efforts transmission corresponding to the first multimedia network access message to the reserved channel until the reserved channel is activated for a corresponding reserved service.

55. The apparatus of claim 54, wherein the processor is further configured, when there is no reserved channel which is not active, and when there is a third best efforts transmission on a fourth channel of the plurality of channels having a lower comparative priority than the comparative priority of the first multimedia network access message, to remove the third best efforts transmission from the fourth channel and to assign the first best efforts transmission corresponding to the first multimedia network access message to the fourth channel.

56. The apparatus of claim 55, wherein the processor is further configured, when there is no third best efforts transmission on the fourth channel having the lower comparative priority than the comparative priority of the first multimedia network access message, to queue the first multimedia network access message for subsequent processing.

57. The apparatus of claim 56, wherein the processor is further configured to maintain a database stored in the memory, the database including an identification of each transmitting device of a plurality of multimedia transmitting devices, and the database further including, for each such multimedia transmitting device, an identification of a corresponding assigned channel of the plurality of channels.

58. The apparatus of claim 57, wherein the processor is further configured to search the database to determine whether there is the second best efforts transmission on the second channel which is moveable to the third channel.

59. The apparatus of claim 57, wherein the processor is further configured to search the database to determine whether there is the third best efforts transmission on the fourth channel having a lower comparative priority than the comparative priority of the first multimedia network access message.

60. The apparatus of claim 54, wherein the network interface receives a second multimedia network access message from a transmitting device, the transmitting device having a current transmission on a current assigned channel, of the plurality of channels, on a first carrier frequency of the plurality of carrier frequencies; and wherein the processor is further configured, when a first vacant channel, of the plurality of channels, is available on the first carrier frequency for the second multimedia network access message, to assign a transmission corresponding to the second multimedia network access message to the first vacant channel; the processor further configured, when the first vacant channel is not available on the first carrier frequency, when a second plurality of channels for the second multimedia network access message and for the current transmission are available on a second carrier frequency of the plurality of carrier frequencies, the second plurality of channels being a subset of the plurality of channels, and when the current transmission is moveable, to reassign the current transmission and assign the transmission corresponding to the second multimedia network access message to the second plurality of channels on the second carrier frequency.

* * * * *